United States Patent
Antonsson et al.

(10) Patent No.: US 6,426,951 B1
(45) Date of Patent: Jul. 30, 2002

(54) DEVICE AND A METHOD FOR SWITCHING DATA FRAMES

(75) Inventors: Dan Antonsson, Vikingstad; Fredrik Malmqvist, Karlstad, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/137,235

(22) Filed: Aug. 20, 1998

(30) Foreign Application Priority Data

Aug. 21, 1997 (DE) ......................... 197 36 447

(51) Int. Cl.$^7$ ............................ H04Q 11/04; H04J 3/22
(52) U.S. Cl. ..................... 370/358; 370/379; 370/382
(58) Field of Search .............................. 370/357, 358, 370/360, 363, 369, 370, 371, 376, 378, 379, 380, 381, 382

(56) References Cited

U.S. PATENT DOCUMENTS

| | | | |
|---|---|---|---|
| 4,485,468 A | * 11/1984 | Slana | 370/358 |
| 4,771,420 A | 9/1988 | Deschaine et al. | 370/376 |
| 5,287,350 A | * 2/1994 | Ito et al. | 370/358 |
| 5,351,236 A | 9/1994 | Pawelski | 370/358 |
| 5,420,854 A | * 5/1995 | Hiraiwa | 370/359 |
| 5,784,369 A | * 7/1998 | Romiti et al. | 370/358 |
| 6,229,805 B1 | * 5/2001 | Linton | 370/358 |

FOREIGN PATENT DOCUMENTS

| | | |
|---|---|---|
| EP | 0224311 A2 | 6/1987 |
| EP | 0418475 A2 | 3/1991 |
| EP | 0528206 A2 | 2/1993 |
| EP | 0769886 A2 | 4/1997 |
| WO | WO97/27720 | 7/1997 |

* cited by examiner

Primary Examiner—Chau Nguyen
Assistant Examiner—Soon-Dong Hyun
(74) Attorney, Agent, or Firm—Burns, Doane, Swecker & Mathis, L.L.P.

(57) ABSTRACT

The invention relates to a switching device for switching input data frames (IDF) from a plurality of N input lines ($i_1, i_2, \ldots i_n, i_N$) to output data frames (ODF) on a plurality of M output lines ($o_1, o_2, \ldots o_n, o_M$). The switching device contains a number K of switch pattern units, each containing a specific switch pattern. A number K of frame store memories ($FSM_j$) each store all input data frames from all input lines in every frame period. Each frame store memory is used for selecting bits to a sub-group of M/K output lines. The parallelly working units ($u_1, u_2, \ldots u_K$) each sequentially select a plurality of M/K bits from the stored input data frames and simultaneously assign the selected bits to the output data frames on the respective sub-group of output lines. The selection and assigning of bits in each unit is performed at a M/K times higher clock rate than the bit rate on the input data lines. Thus, a bit-orientated reading of input data frames and writing of output data frames is achieved which allows a flexible switching of full rate as well as sub-rate input PCM data frames.

27 Claims, 11 Drawing Sheets

PARALLEL ARCHITECTURE OF THE INVENTIVE DEVICE

THE ADD - ON SUBRATE SWITCH

EXAMPLE OF 24 kBITS/s SUBRATE CONNECTION

GSS ARCHITECTURE WITH SUBRATE SWITCH MODULE

LOGICAL STRUCTURE OF SUBTRATE SWITCH

THE SUBRATE SWITCHING FUNCTION

PARALLEL ARCHITECTURE OF THE INVENTIVE DEVICE

BROADCAST FUNCTION

DEVICE AND A METHOD FOR SWITCHING DATA FRAMES

This application claims priority under 35 U.S.C. §§119 and/or 365 to 197 36 447.0 filed in Germany on Aug. 21, 1997; the entire content of which is hereby incorporated by reference.

FIELD OF THE INVENTION

The invention relates to a device and a method for switching input data frames from a plurality of input lines to output data frames on a plurality of output lines. In particular, the device and method are provided for switching data frames which comprise time slots which are divided into several sub-channels. The device and method of the invention can perform an efficient switching of such data frames at an arbitrary rate, i.e. at the normal rate of the time slots or at the sub-rate of the sub-channels.

Such normal rate or sub-rate switching is particularly advantageous in telecommunication networks, in particular in telecommunication networks using PCM-links (Pulse Code Modulation links). Furthermore, the device and method of the invention find wide application for testing and simulation equipment, where data frames need to be switched between a plurality of input lines and a plurality of output lines.

BACKGROUND OF THE INVENTION

In a given configuration of a telecommunication network, more capacity is demanded, when more subscribers are to be connected without extending the facilities of the telecommunication network. This is particularly true for mobile cellular telecommunication networks where new (mobile) subscribers are added to the network at a fast rate. Each new subscriber can be considered as using a new channel for transmission and reception of information and therefore, the obvious demand is to increase the number of channels whenever a new subscriber is added.

The physical connections in the core of a telecommunication network (e.g. between exchanges and base stations or between base transmitter stations and mobile subscribers) are usually PCM-links (Pulse Code Modulation links) for a frame-based transmission and reception of data. That is, on the PCM-links or PCM-lines data is transmitted in successive frames which are transmitted/received at a fixed frame rate of e.g. 125 $\mu s$ (8 kHz) (2048 kbits/s). The frame can be subdivided into a certain number of time slots (also called channels), typically 32 or 24 time slots depending on the system type. Each time slot has a capacity to carry information data (i.e. speech data) at a rate of 8 kbit/s which is the normal telephony speech quality. For example, one time slot consists of 8 bits and corresponds to a transmission speed of 64 kbits/s (full rate) on one individual PCM-link, wherein speech is respectively coded as information data of 8 bits in each time slot.

Modern compression/decompression techniques, however, allow to compress/decompress speech data to a smaller number of bits than 8 bits, i.e. to transcode the speech to a lower data rate using a smaller number of bits. Therefore, instead of adding one more complete new channel in the mobile telecommunication system when a new subscriber station is to be connected, a more advantageous and efficient use of the resources in the network is to perform a compression/decompression of the speech data and to subdivide the time slots further into several sub-time slots or sub-channels.

A further aspect that may lead to a subdivision of the time slots into sub-time slots or sub-channels is the transmission of signalling information between modules in the system which also uses time slots on the PCM-links. This signalling information can be transmitted at a lower speed, i.e. with less bits per second, such that the usage of a full time slot for this signalling data would be a waste of resources.

When one time slot e.g. consists of 8 bits and corresponds to a transmission speed of 64 kbits/s (at full rate) on a PCM-link, then using a sub-time slot (sub-channel) of 4 bits will use a corresponding speed of 32 kbits/s (sub-rate) wherein one time slot is divided into two sub-time slots. Similarly a sub-time slot of 1 bit gives a speed of 8 kbits/s and 8 sub-time slots per time slot. If a channel has a bandwidth of n*8 kbits/s with n=1 . . . 7, then n=1 can be called a sub-rate channel with a half rate, n=2 can be called a sub-rate channel with a full rate and 2<n<8 can be called a sub-rate channel with an enhanced rate. The normal rate (a full channel) channel has 64 kbits/s. Obviously, looking at one PCM-link, the individual frames of a series of frames may each be subdivided differently into sub-channels of different sub-rates.

In the telecommunication networks many exchanges and switching devices are necessary, e.g. to switch input data frames from a plurality of input lines to output data frames on a plurality of output lines. There are well established techniques for full-rate switching, i.e. switching packets or frames having a number (32 or 24) of time slots of equal bandwidth (e.g. 64 kbits/s). However, the technique of using sub-channels with different sub-rates is a fairly recently developed new idea and has put new demands on the hardware in the switching devices, since the old full-rate switching devices in general cannot handle the switching of time slots which are further subdivided into sub-time slots or sub-channels.

Thus, there is the need for developing new switching architectures that do not only handle the normal rate switching but also the sub-rate switching.

SUB-RATE SWITCHING USING A CONVENTIONAL NORMAL RATE SWITCH

FIG. 1 shows a group switch sub-system GSS for switching data frames from one switching network terminal SNT A to a switching network terminal SNT B on input and output lines $i_1$, $o_1$; $i_2$, $o_2$ using a normal rate switch NRS having an add-on sub-rate switch SRS which is to take care of the switching of the sub-channels or sub-time slots.

The sub-rate switch SRS is connected to the normal switch via one or more physical links each containing a number of time slots. The sub-rate switch SRS can connect any bit from any time slot coming from the normal rate switch to any bit in any time slot going back to the normal rate switch NRS.

FIG. 2 shows an example of one time slot in an input data frame IDF and a time slot of an output data frame ODF in a 24 kbits/s sub-rate connection. Using the sub-rate switch extension to the normal rate switch NRS, a connection of a sub-rate channel x from the switching network terminal SNT A to a sub-rate channel y at the switching network terminal SNT B can be established using the following three steps:

1. A 64 kbits/s connection in the normal rate switch from the time slot on SNT A which contains sub-channel x to any free time slot on the sub-rate switch SRS is established.
2. In the normal rate switch NRS, a connection is established from any other free time slot on the sub-rate switch SRS to the time slot on the SNT B containing the sub-channel y.

3. In the sub-rate switch SRS, the connection between the appropriate bits of the bit positions in the time slots that were selected in steps 1 and 2 is made.

FIG. 3 shows a group switch sub-system GSS with a 64 K implementation. The sub-rate switch SRS (consisting of sub-rate switch modules SRSM for each plane) is connected to the normal switch via 8 pairs of time switch modules TSMs to give 4 K multiple positions MPUs. The time switching modules TSMs have the DL2 interfaces replaced by a new interface with 512 time slots, but their switching function is unchanged. RP designates the regional processors and SPM is the space switch module, whereas CLM is the clock module providing the synchronization within the group switch sub-system GSS.

Because the sub-rate switch can connect any time slot to any time slot, the speech memories in the connecting time switching modules TSMs are not needed. For each bit of each outgoing time slot, the sub-rate switch SRS must have one memory location in a control memory. The entry of the control memory location defines a specific bit in a switch pattern memory which should be read. Hence, in order to connect a channel of more than 8 kbits/s a number of control memory locations must be written, too. For example, to set up the 24 kbits/s connection shown in FIG. 2 requires three control memory locations to be written. However, the bits of a sub-channel are thus guaranteed to be in the same order in an output time slot as they were in the input time slot.

As will be appreciated, the time switching modules TSM (in the group switching system GSS) are the time switch modules only for the full-rate channels. The add-on modules SRS and SRSM in FIGS. 1, 3 enable the sub-rate switching. For example, the add-on module SRSM handles 8 PCM-links on the input and 8 PCM-links on the output. Therefore, the SRSM consists of 8 identical base modules (FIG. 3), each handling 8 PCM-links at the input and generating one PCM-link at the output. This requires first to store one frame from all channels and then read out the data in a different order.

The configuration of a sub-rate switch module of FIG. 3 is shown in FIG. 4 with more details. FIG. 4 relates to the preamble features a), b), c) of claim 1 and claim 21. Here, input data frames from a plurality of input lines $i_1, i_2 \ldots i_N$ (N=8) are switched to output data frames on a plurality of output lines $o_1, o_2 \ldots o_M$ (M=8). In general, N≠M is valid, however, in the following, the case N=M will be considered. As is seen from FIG. 4, for switching 8 input PCM-links to 8 PCM output links, 64 frame store buffer FSB must be used, each storing one complete frame of the respective input data frames. A first switch pattern memory SPM selects the bit positions to be read in the time slot (i.e. the bits corresponding to a sub-time slot in the time slot) and the second switch pattern memory SPM' selects the time slot out of the (32 or 24) time slots stored in the respective frame store buffers FSB. As is seen from FIG. 4, the hardware requirements are extensive for such a sub-rate switch. Furthermore, the sub-rate switch module SRSM is limited to 8 PCM-links and depends on the time switching module TSM to switch the sub-rate channels. Sub-rate switching of e.g. 16 PCM-links must use two TSM modules and two SRSM modules. Furthermore, a whole PCM-frame from all 8 incoming PCM-links must be buffered for each of the outgoing PCM-links as FIG. 4 illustrates.

The advantage of using the add-on sub-rate switch to the conventional full-rate switch (FIG. 1) is that the reading of the frame store buffer FSB can be done at the PCM bit rate of typically 2 Mbits/s. However, the hardware requirements are extensive, e.g. for an implementation with 16 PCM-links on the input and 16 PCM-links on the output regarding the circuit board level, two sub-rate switch modules SRSM consist of 16 circuit boards (plus two time switch modules TSM) assuming a standard European printed circuit board of 233×160 mm². If the configuration should be increased to more than 16 PCM-links on the input and output, obviously the hardware requirement is even more extensive in the configuration using an additional sub-rate switch to the conventional full-rate switch.

SUMMARY OF THE INVENTION

Therefore, the object of the present invention is to provide a switching device and a switching method that perform an efficient fast switching of data frames including full-rate and sub-rate time slots without the need of extensive hardware.

This object is solved by a device for switching input data frames from a plurality of N input lines to output data frames on a plurality of M output lines, comprising:

a) a frame memory for storing input data frames;

b) a switch pattern memory for storing a predetermined switch pattern; and c) a control means for selecting bits from bit positions in said stored input data frames and for assigning said selected bits to bit positions on output data frames according to said stored predetermined switch pattern;

characterized in that d) said frame memory comprises a number j=2 to K of frame memories each storing all input data frames of all input lines;

e) said switch pattern memory comprises a number of j=2 to K of switch pattern units each storing a predetermined switch pattern associated with a respective one of said frame memories; and f) said control means is provided for sequentially selecting a respective number of M/K bits from input data frames stored in a j-th frame memory, with j=1 to K, according to a respective switch pattern stored in an associated j-th switch pattern unit, and for assigning said selected bits to bit positions simultaneously on output data frames on a predetermined output line sub-group including M/K output lines.

Furthermore, this object is solved by a method for switching input data frames from a plurality of N input lines to output data frames on a plurality of M output lines, comprising the following steps:

a) storing input data frames in a frame memory;

b) storing a predetermined switch pattern in a switch pattern memory; and c) selecting bits from bit positions in said stored input data frames and assigning said selected bits to bit positions on output data frames according to said stored predetermined switch pattern by a control means;

characterized by the following steps:

d) storing all input data frames of all input lines in a number j=2 to K of frame memories;

e) storing a predetermined switch pattern associated with a respective one of said frame memories in a number of j=2 to K of switch pattern units; and f1) sequentially selecting a respective number of M/K bits from input data frames stored in a j-th frame memory, with j=1 to K; and f2) simultaneously assigning said selected bits to bit positions on output data frames on a predetermined output line sub-group including M/K output lines according to a respective switch pattern stored in an associated j-th switch pattern unit.

Such a method and such a device are capable of performing a sub-rate switching more economically, essentially utilizing a different buffering technique and a special control logic. Implementation in hardware of the proposed module can be done with a minimum number of standard components. As a comparison, for an implementation of 16 PCM-links on the input and 16 PCM-links on the output, regarding the circuit board level, the inventive device and method only occupies one standard European printed circuit board with no need of additional time switching modules TSM as explained above with reference to FIGS. 1 to 4.

The inventive device and method is essentially based on the concept of using several frame store memories and several switch pattern units parallely and grouping the output lines into a number of sub-groups. The switch pattern units associated with the respective frame memories then respectively assign bits on the output line sub-group simultaneously after having read the respective bit values from bit positions indicated by the switch pattern sequentially.

Advantageously, the sequential selecting of bits from the stored input data frames and the simultaneous assignment of the selected bits to the bit positions on the output data frames on the sub-group of output lines is done at a higher clock rate than the reading-in of bits to the frame store buffers. Thus, it can be ensured that the assigning of bits to all output data frames is performed in a bit- and frame-synchronized manner.

Advantageously, for a system of 16 PCM input links and 16 PCM output links, only two parallely working frame store memories are used together with one switch pattern memory of the same size as before indicated in FIG. 4. The switch pattern memory is only differently divided into switch pattern units respectively for the odd and even switch pattern used for the respective frame store memory. Thus, since only one switch pattern memory and only two frame store memories are used for 16 PCM-links on the input and 16 PCM-links on the output, the hardware requirements are much less than in the add-on sub-rate switch.

A further advantage of the device and method of the invention is that is has a general scaleable switching function with no side effects. The method and device can be implemented in a well-balanced hardware device, where a minimum number of standard components are used and the relaxed timing demands are such that no physical difficulties are expected at the component and board level. The implementation is highly economical in terms of component utilization and production of boards. Thus, due to the division of the switching module into parallely working units where each unit is working in a time-shared process with a relaxed timing at a faster rate than the PCM bit rate (e.g. 8 times the PCM bit rate in the 16 input/16 output configuration), the sub-rate switching requires less hardware and can still operate at the bit rate of the incoming PCM data frames.

Further advantageous embodiments and improvements of the invention may be taken from the dependent claims. Hereinafter, the invention will be illustrated with reference to its embodiments and with reference to the attached drawings.

BRIEF DESCRIPTION OF THE DRAWINGS

A more complete appreciation of the invention and many of the attended advantages and objects thereof will be readily obtained as the same becomes better understood by reference to the following detailed descriptions when considered in connection with the accompanying drawings. In these drawings.

FIG. 8-1 shows the device according to the invention including a plurality of K parallelly working units for switching input data frames from a plurality of N input lines to output data frames on a plurality of M output lines;

FIG. 8-2 shows an embodiment of the device in FIG. 8-1 including two frame store memories for odd and even PCM output links;

FIG. 10-1 shows the bit handling performed by the control unit for sequentially selecting the bits from the stored input data frames and for simultaneously assigning these bits to a sub-group of PCM output lines;

FIG. 10-2 shows a content of the odd and even switch pattern units SPMO, SPMe used in FIG. 8-2.

Throughout the drawings, the same or similar reference numerals designate the same or similar parts in all embodiments.

Hereinafter, first the general configuration of the sub-rate switching device of the invention will be illustrated with reference to FIG. 5. It should, however, be noted that the inventive device is a general configuration not restricted to handling only sub-rate switching or full-rate switching but any combination of data frames which are divided into time slots which are in turn divided into sub-channels even of different size in each time slot can be used. In fact, the inventive method and device is bit-orientated and not sub-channel-orientated and thus performs a bit-switching without explicit knowledge of how the time slots are actually subdivided into sub-channels. Throughout the description, the expressions "switching" and "exchanging" or "switching device" and "exchange device" etc. are used to designate the same function, i.e. to transfer a bit, sub-channel, full channel or frame on an arbitrary input line to one or more arbitrary output lines.

General Configuration of the Inventive Device

Figure 5:
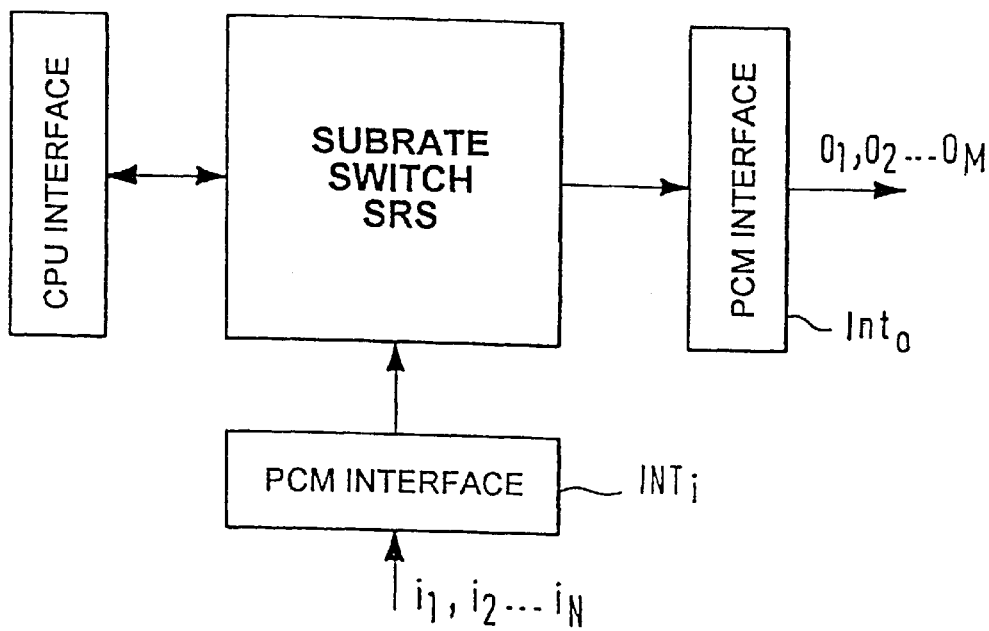
FIG. 5 shows an overall configuration of the sub-rate switch SRS of the invention.

FIG. 5 shows a system overview of the inventive device SRS, which is a sub-rate switch for switching input data frames from a plurality of N input lines $i_1, i_2 \ldots i_N$ to output data frames on a plurality of M output lines $o_1, o_2 \ldots o_n, o_M$ through an input interface $INT_i$ and an output interface $INT_o$. The input lines and output lines can be PCM-links comprising data frames at speeds up to 2048 Mbits/s with time slots of full-rate or any sub-rate in arbitrary combinations. As explained before, the inventive device is not time slot-orientated but bit-orientated so that the PCM-links may comprise data frames of a full rate or any sub-rate.

Figure 6:
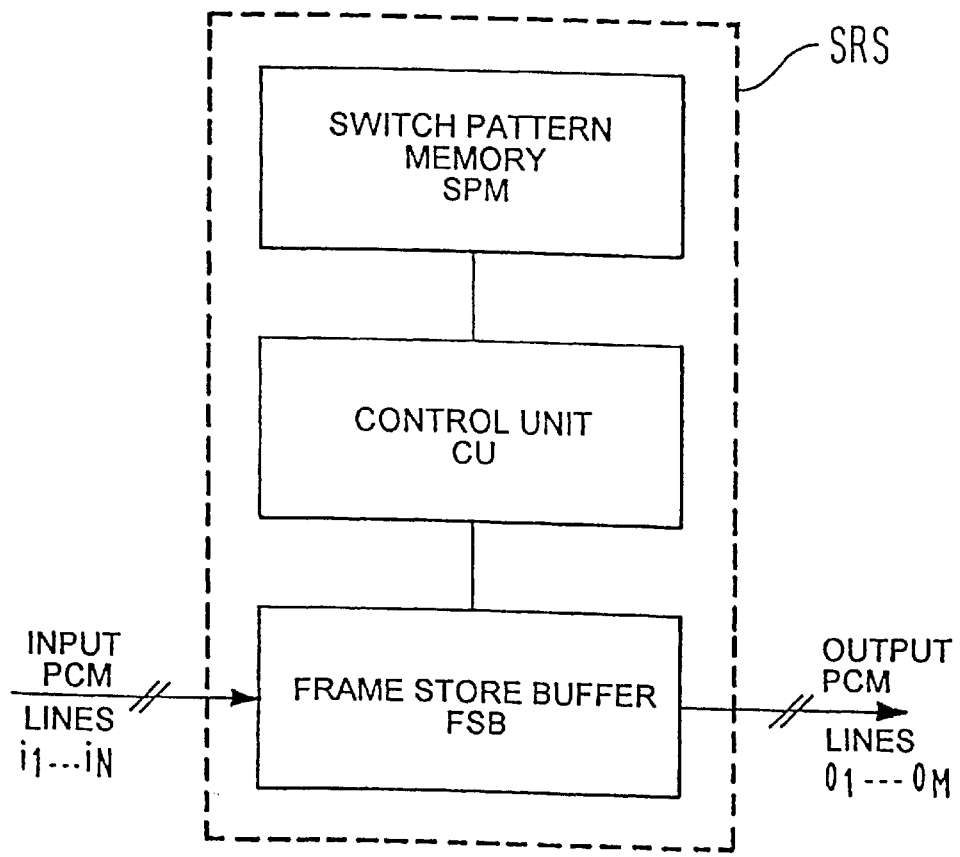
FIG. 6 shows an overall view of the contents of the sub-rate switch SRS shown in FIG. 1.

FIG. 6 shows a general overview of the contents of the sub-rate switch SRS shown in FIG. 5. Similar to FIG. 4, the sub-rate switch SRS comprises a frame buffer FSB for storing input data frames from the plurality of PCM input lines $i_1 \ldots i_N$. A switch pattern memory SPM is provided for storing a predetermined switch pattern SP (see also FIG. 7) like the switch pattern memories SPM, SPM' in FIG. 4. A control means CU is provided for selecting bits from bit positions in the stored input data frames in the frame store buffer FSB and for assigning the selected bits to bit positions on output data frames on the PCM output lines according to the stored predetermined switch pattern SP in said switch pattern memory SPM. The sub-rate switch SRS in FIG. 6 works within the PCM frame format which consists—as explained above—of up to 32 time slots (in total 256 bits). The frame store memory FSB stores all input data frames from all input PCM-lines $i_1 \ldots i_N$ and a respective number of output data frames on the M output PCM-lines $o_1 \ldots o_M$ are generated by a bit-wise selection of the bits from any bit position in any input data frame and by assigning the selected bits to particular bit positions on the output data frames.

Figure 4:
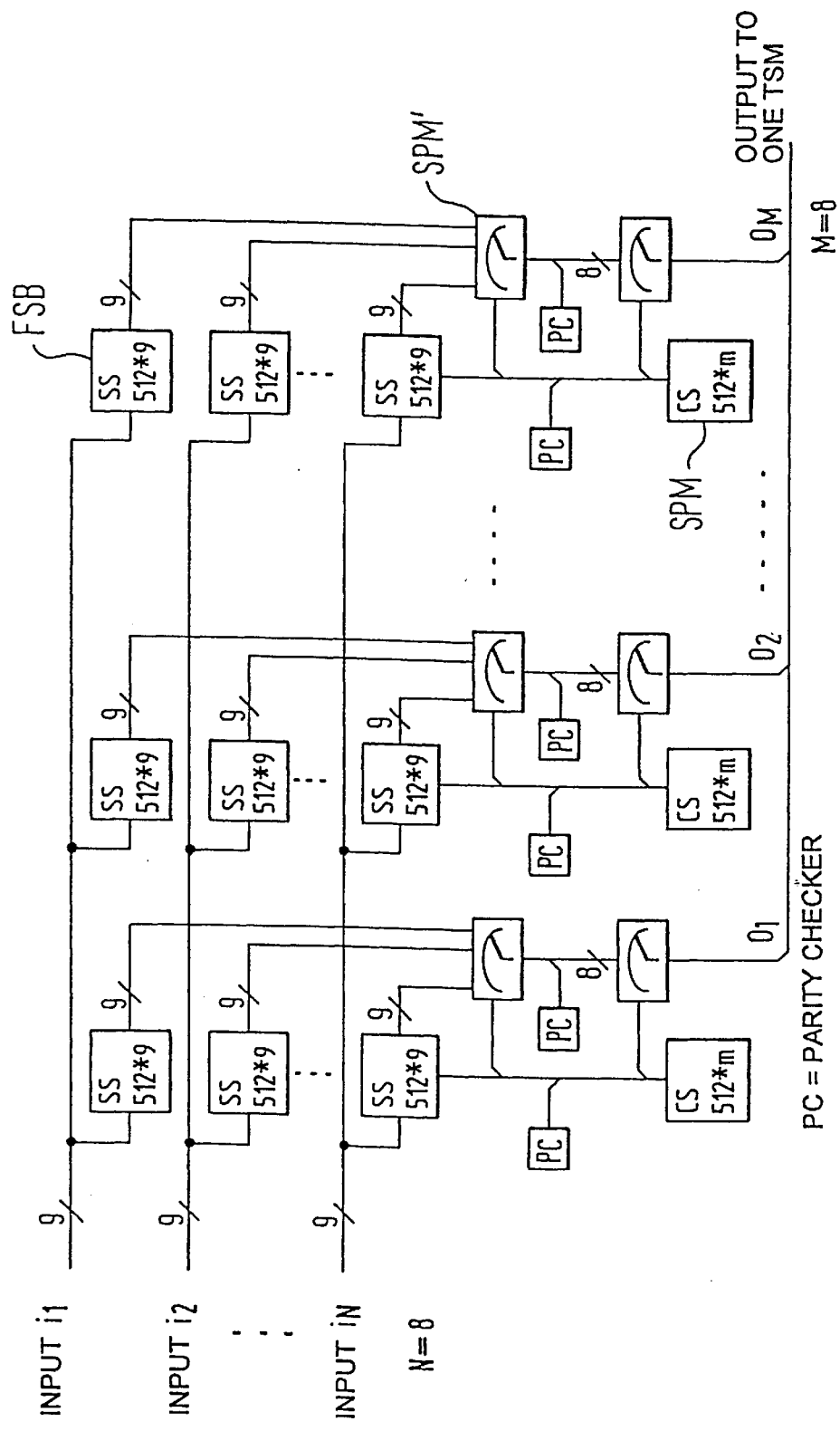
FIG. 4 shows an example of the logical structure of the sub-rate switch SRS shown in FIG. 1.

In FIG. 6, the switch pattern memory SPM may be regarded as one separate memory unit and the frame store buffer FSB may be regarded as containing a number of frame memories similar as in FIG. 4 for cross-connecting each input PCM-line to each output PCM-line.

First Embodiment of the Invention

Figure 1:
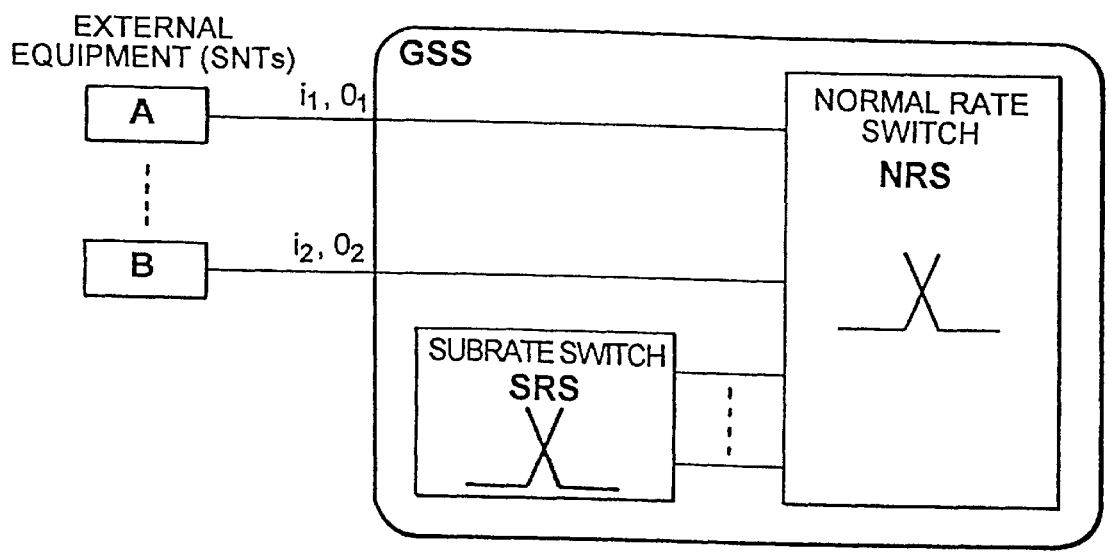
FIG. 1 shows a proposal for an add-on sub-rate switch to a conventional normal rate switch NRS.
Figures 1, 8:
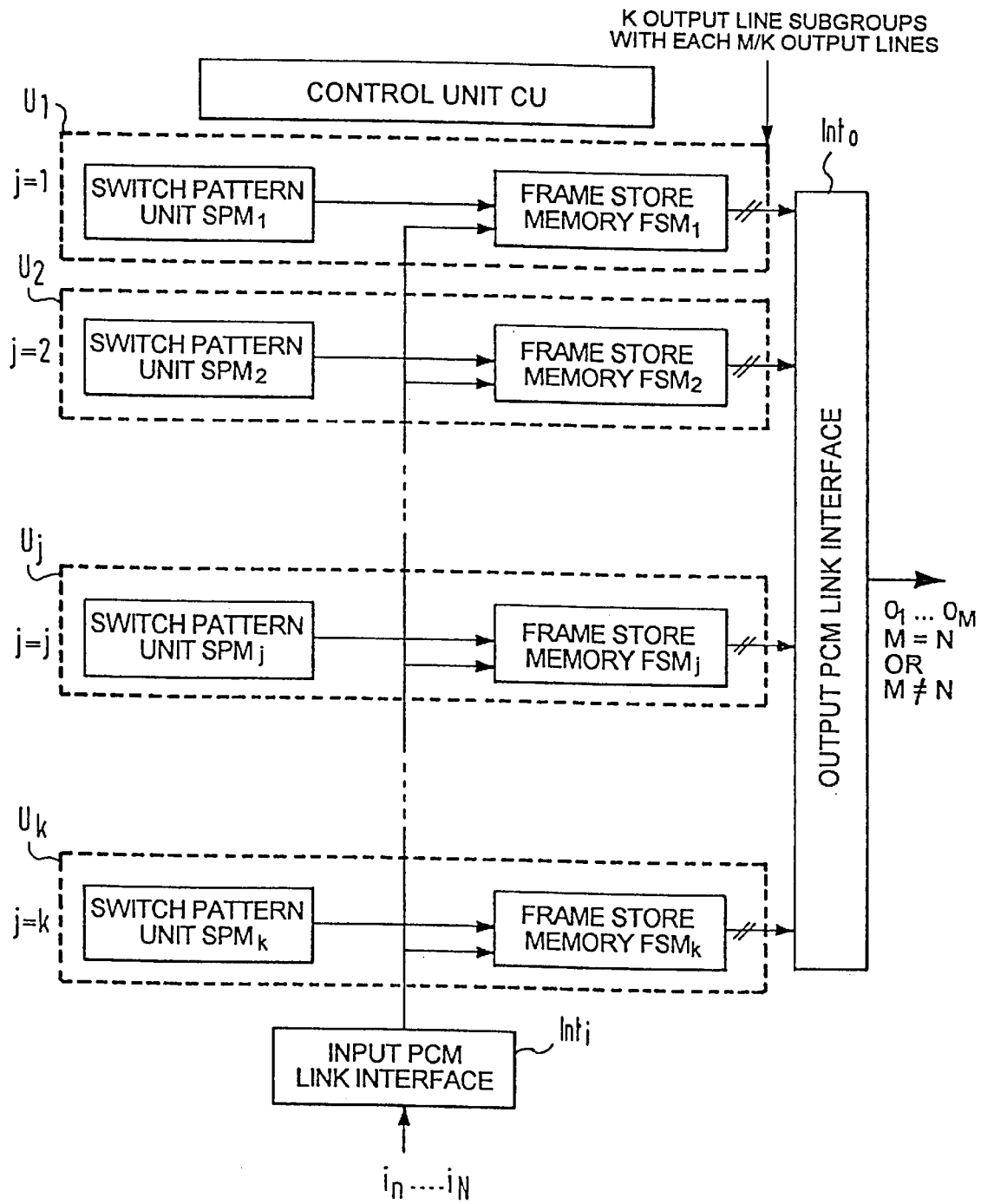
Figures 2, 8:
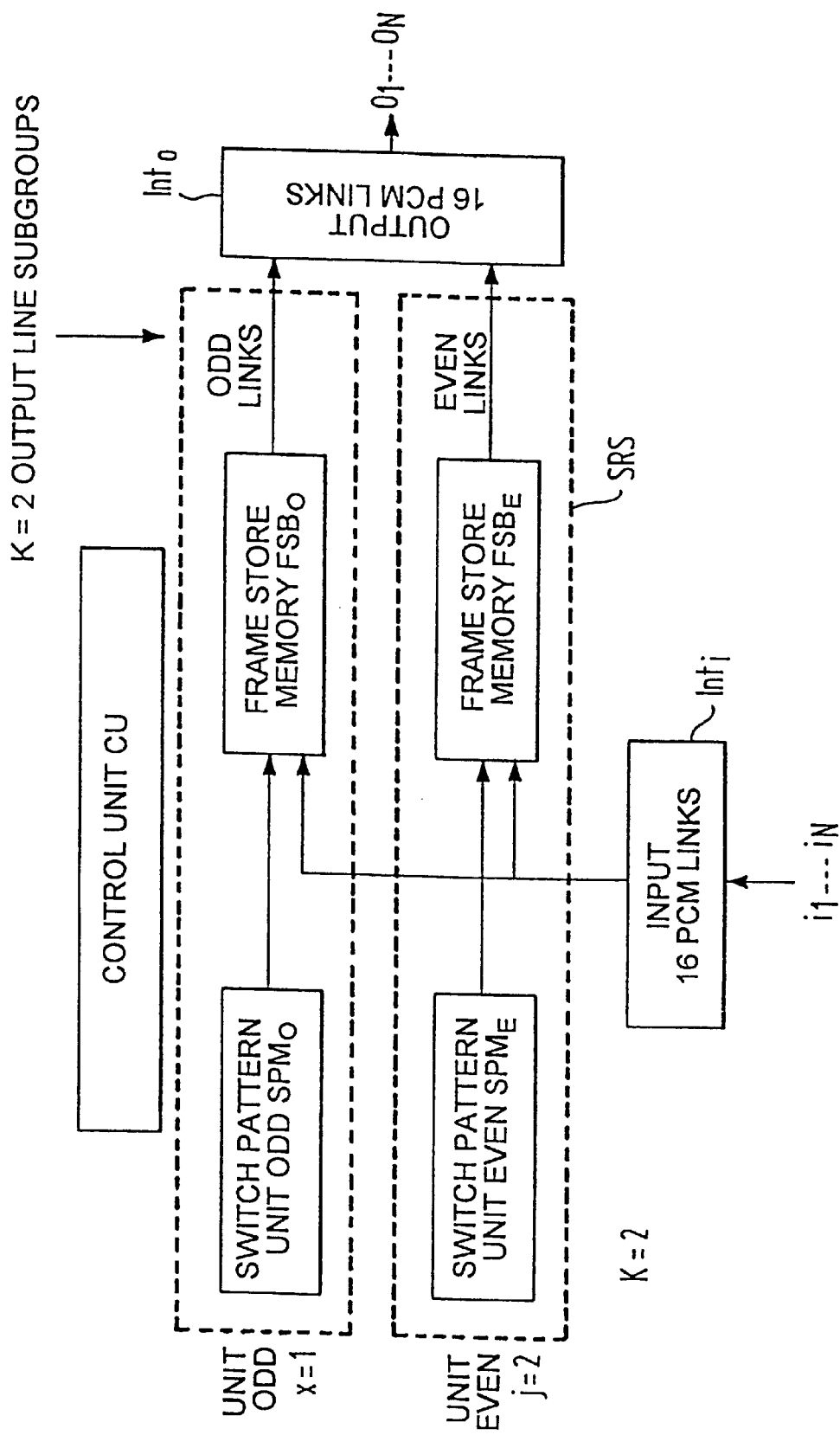

FIG. 8-1 shows a first embodiment of the inventive device, in particular the parallel architecture of switch pattern units and frame store memories as already generally indicated in FIG. 6. As shown in FIG. 8-1, the sub-rate switching device SRS comprises a number of separately defined units $u_1, u_2 \ldots u_j \ldots u_K$. Thus, the sub-rate switch device SRS is divided into parallelly working units as may be taken from FIG. 8-1. Each unit $u_1 \ldots u_K$ contains a switch pattern unit $SPM_1 \ldots SPM_j \ldots SPM_K$ and an associated frame store memory $FSM_1 \ldots FSM_j \ldots FSM_K$. Each frame memory stores all input data frames of all input lines as is indicated with the connection between the input PCM line interface $INT_i$ and the respective frame store memories. Each switch pattern unit $SPM_j$ stores a predetermined switch pattern for selecting bits from bit positions in the stored input data frames and for assigning respective bits to output data frames on a sub-group of output lines. As is indicated with the double-crossed line at the output of each frame store memory $FSM_j$, there are defined K output line sub-groups with each M/K output lines, wherein M is the number of total output lines $o_1 \ldots o_M$. The number of output lines M may be equal to the number of input lines N or may be in fact a different number (N=N or M≠N)

As will be seen in the following, the parallel architecture of the inventive device in FIG. 8-1 comprises a number of units $u_j$ which is independent of the number of input lines N and independent on the number of output lines M. However, at least two units must be provided, i.e. K is at least 2.

A control means CU performs a similar function as the general control means CU in FIG. 6. That is, the control means sequentially selects a number of M/K bits from input data frames stored in a frame memory of any one unit $u_j$ according to a respective switch pattern stored in an associated switch pattern unit $SPM_j$. After sequentially selecting the respective number of bits from the input data frames, the control means CU assigns these bits simultaneously on the output data frames on the particular output line sub-group at the output of the unit $u_j$. Thus, each unit is provided for simultaneously assigning a respective sub-number of M/K bits to the respective number of M/K output lines.

As described above, the control means processes all PCM-links for a certain bit position during one bit time. The division of the sub-rate switch module into the parallelly working units ensures that this timing is kept at a level where difficulties with the implementation is avoided in terms of components and board manufacturing.

In FIG. 8-1, no particular preferred grouping of the output lines M/K is made. However, the sub-grouping of output lines can be performed in such a way that the first unit $u_1$ is responsible for assigning bits on output data frames of the first output line $o_1$ and every (1+jM/K)-th output line $o_{(1+jM/K)}$. The second unit $u_2$ is provided for assigning bits on output data frames on the second output line $o_2$ and every (2+jM/K)-th output line $o_{(2+jM/K)}$. The third unit $u_3$ assigns bits on output data frames on output lines $o_3$ and every (3+jM/K)-th output line $o_{(3+jM/K)}$ etc., with j=1,2 . . . K−1.

For example, when four units $u_j$ are provided (K=4) and 16 input lines (N=16) and 16 output lines (M=16) are used, then the output line sub-group 1 from unit $u_1$ can comprise the output lines with numbers 1, 5, 9, 13, the output line sub-group 2 of unit $u_2$ can comprise the output lines with numbers 2, 6, 10, 14 . . . and the output line sub-group 4 from unit $u_4$ can comprise the output lines with numbers 4, 8, 12, 16. That is, 4 PCM lines per module are used which is not an optimal system (<8), since in general with K=4 units $u_j$ is in total a number of 8 PCM lines per unit can be handled.

Figures 1, 10:
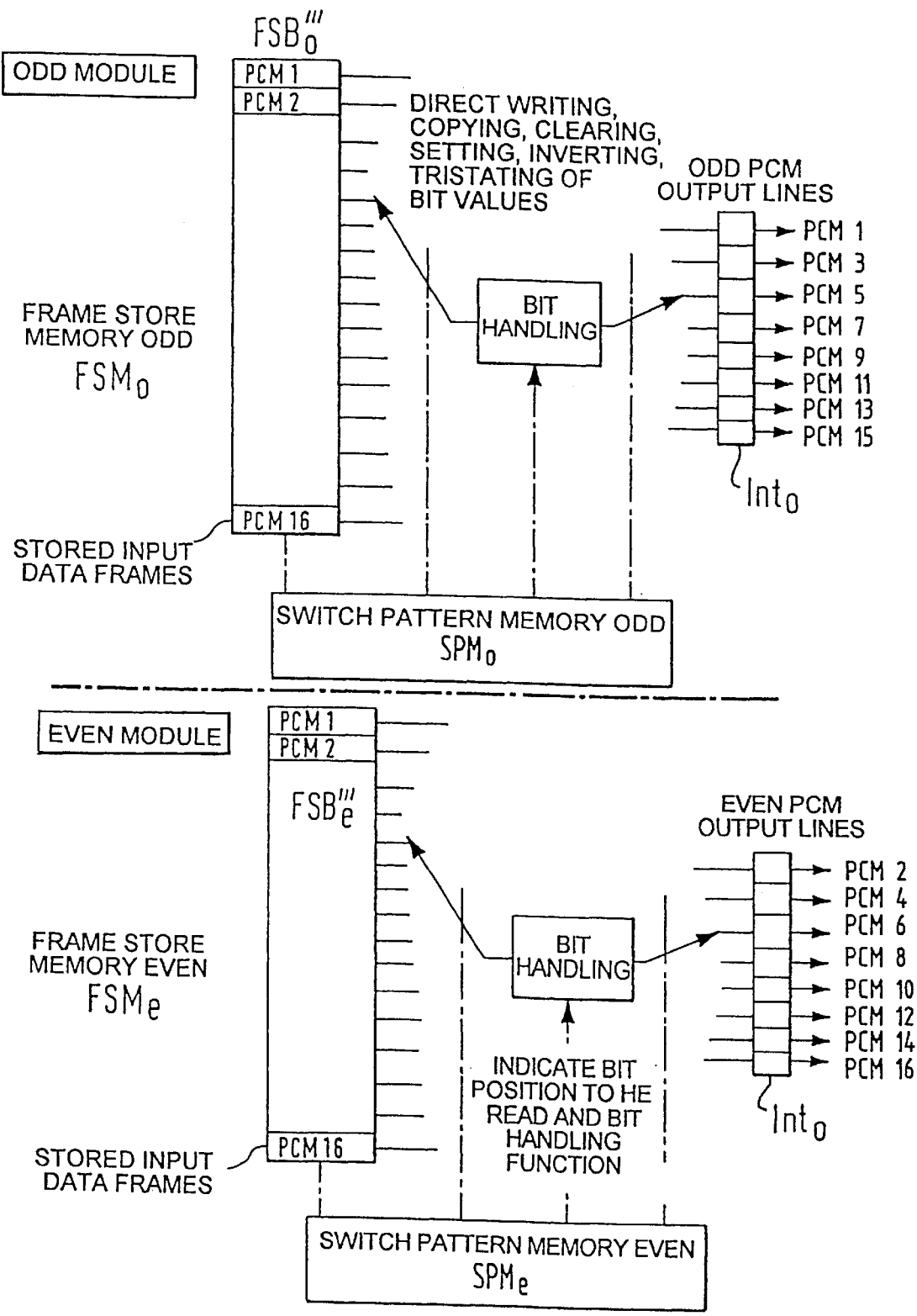
Figures 2, 10:
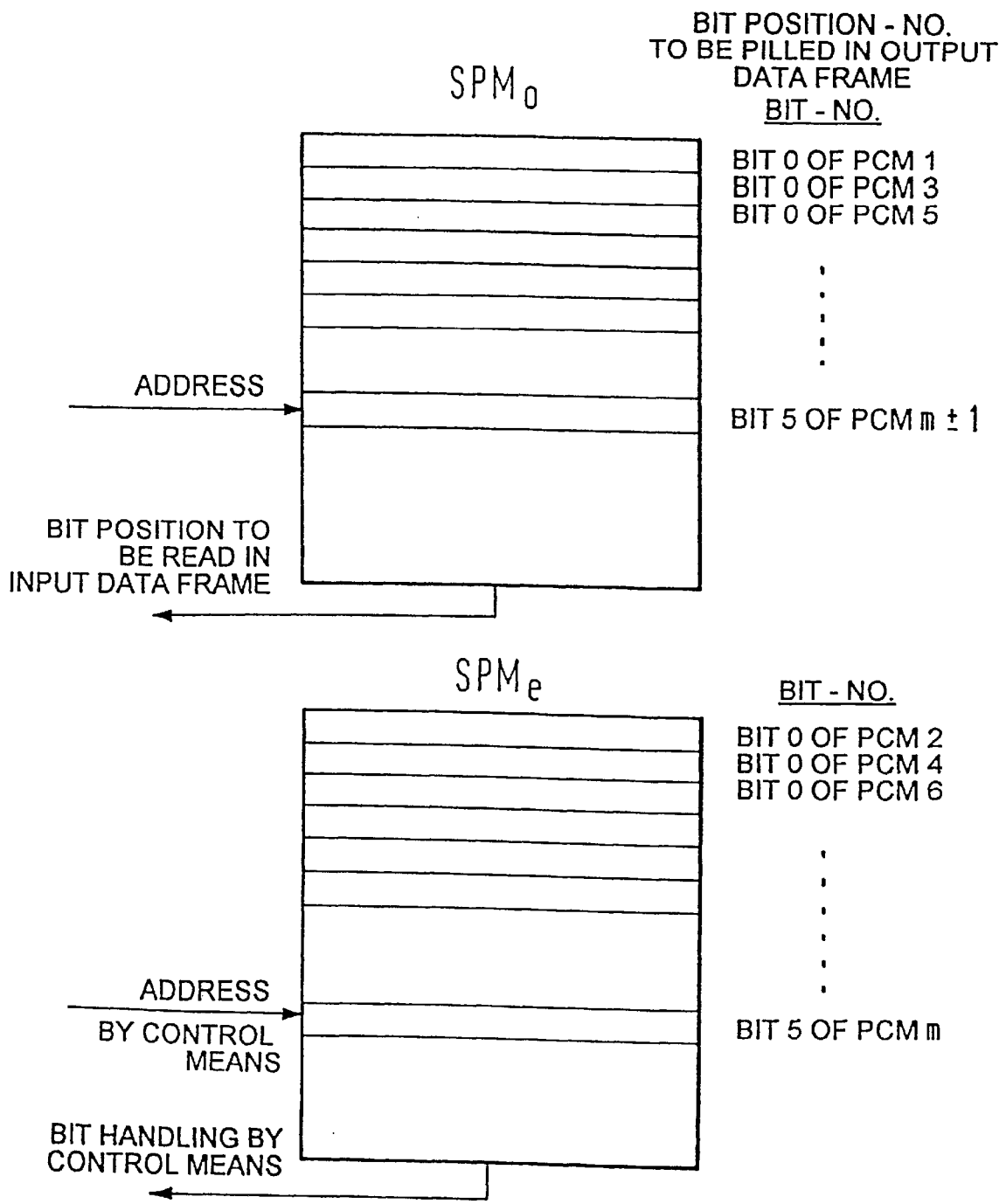

The reading in of data bits from the input data frames and the assigning of data bits to the output data frames is bit-synchronized, i.e. for each parallel reading-in of one bit to all frame store memories $FSM_j$, there is a simultaneous assigning of one bit to a bit position in all output data frames on all output lines (see FIG. 10-1). To ensure this, the selecting of bits by using the switch pattern units is performed at a rate which is M/K times faster than the bit rate on the incoming PCU-lines $i_1 \ldots i_N$. That is, during the reading-in of one bit to the respective frame store memories $FSM_j$, respectively M/K bits are selected sequentially from data frames already stored in the frame store memory by using the switch pattern contained in the respective switch pattern unit $SPM_j$. The sequential selection and assignment of bits using this switch pattern memory will be further explained below with reference to FIG. 7.

However, the switch pattern SP respectively contained in the switch pattern unit $SPM_j$ has a direct association with the number of the output lines of the respective sub-group of output lines from the respective frame store memory $FSM_j$. That is, the sequential switch pattern contained in each switch pattern unit only contains the switch pattern necessary for switching bits on the respective sub-group of M/K output lines. By contrast, each of the frame store memories $FSM_j$ contains all input data frames from all input PCM lines $i_1 \ldots i_N$ in every frame period. Thus, each frame store memory $FSM_j$ has a memory capacity of at least n*N bits (n=number of bits per frame). The frame store memories are really separate memory units for storing all input data frames of all input lines simultaneously. The switch pattern unit $SPM_j$ only needs a storage capacity of N/K memory locations. Thus, the overall switch pattern memory SPM shown in FIG. 6 and also in FIG. 7 may be only subdivided into several switch pattern units with differently organized entries, such that a separate switch pattern SP is respectively provided for the associated frame store memory $FSM_j$. Therefore, the switch pattern units may indeed be separate memory devices, however, in terms of capacity, they together only require the same storage capacity as the single memory device in FIG. 7 and in FIG. 6.

However, by contrast to FIG. 4, the parallel architecture in FIG. 8-1 considerably reduces the hardware requirements regarding the memories since the individual frame store memories shown in the conventional solution in FIG. 4 at each cross-point are not necessary any longer. In FIG. 8-1, the sub-rate switching device comprises parallelly working units, where each unit is working in a time-shared process with a relaxed timing at M/K times the input PCM bit rate in executing the full rate or sub-rate switching on a corresponding sub-group of PCM output lines. Thus, the inventive device is highly economical in terms of component utilization and the production of circuit boards.

Furthermore, the device in FIG. 8-1 is a scaleable general sub-rate switch device for a variable number of PCM-links on the input lines and on the output lines. That is, in general terms, there is no fixed relationship between the number of units K and the number of input and output lines N, M. Therefore, the switching device can be implemented in a well-balanced hardware device where a minimum number of standard components are used and the relaxed timing demands are such that no physical difficulties are expected at the component and board level.

Preferably, a basic switching device may comprise 8 input PCM-lines and 8 output PCM-lines with only using one unit $u_1$ where the sequential selecting of bits is performed at 8 times the input bit rate, however, having a variable buffer capacity capable of storing more than 8 input data frames at any one time. If this basic unit is extended to handle 16 PCM-links at the input and the 16 PCM-links at the output, the switching device may contain two units $u_1$, $u_2$ where each unit in turn performs the selecting and assigning of bits to the respective output data frames at 8 times the input bit rate. If on the other hand a larger sub-rate switching device with e.g. 32 PCM-links at the input and at the output is required, the device consists of 4 parallelly working units $u_1$, $u_2$ . . . $u_4$ with a need for again a double capacity in the respective frame store memories $FSM_j$. However, the units still operate at only 8 times the input bit rate. Depending on the size of circuit boards used for implementing such a switching device, this switching device would still only occupy one circuit board and thus considerably reduces the hardware requirements e.g. needed in the add-on sub-rate switch of FIG. 4.

Whilst the configuration in FIG. 4 for 16 PCM-links at the input and 16 PCM-links on the output still requires two sub-rate switch modules SRSM consisting of 16 circuit boards (plus two time switch modules TSM) the inventive switching system of FIG. 8-1 only occupies one circuit board with no need of time switching modules TSM. These reduced requirements of hardware in the inventive switching device of FIG. 8-1 is attributed to the fact that parallelly working units are used which select bits from the respective frame store memories sequentially at a higher rate than the input bit rate of the PCM input links.

Working Principle of the Switch Pattern Memory

Figure 7:
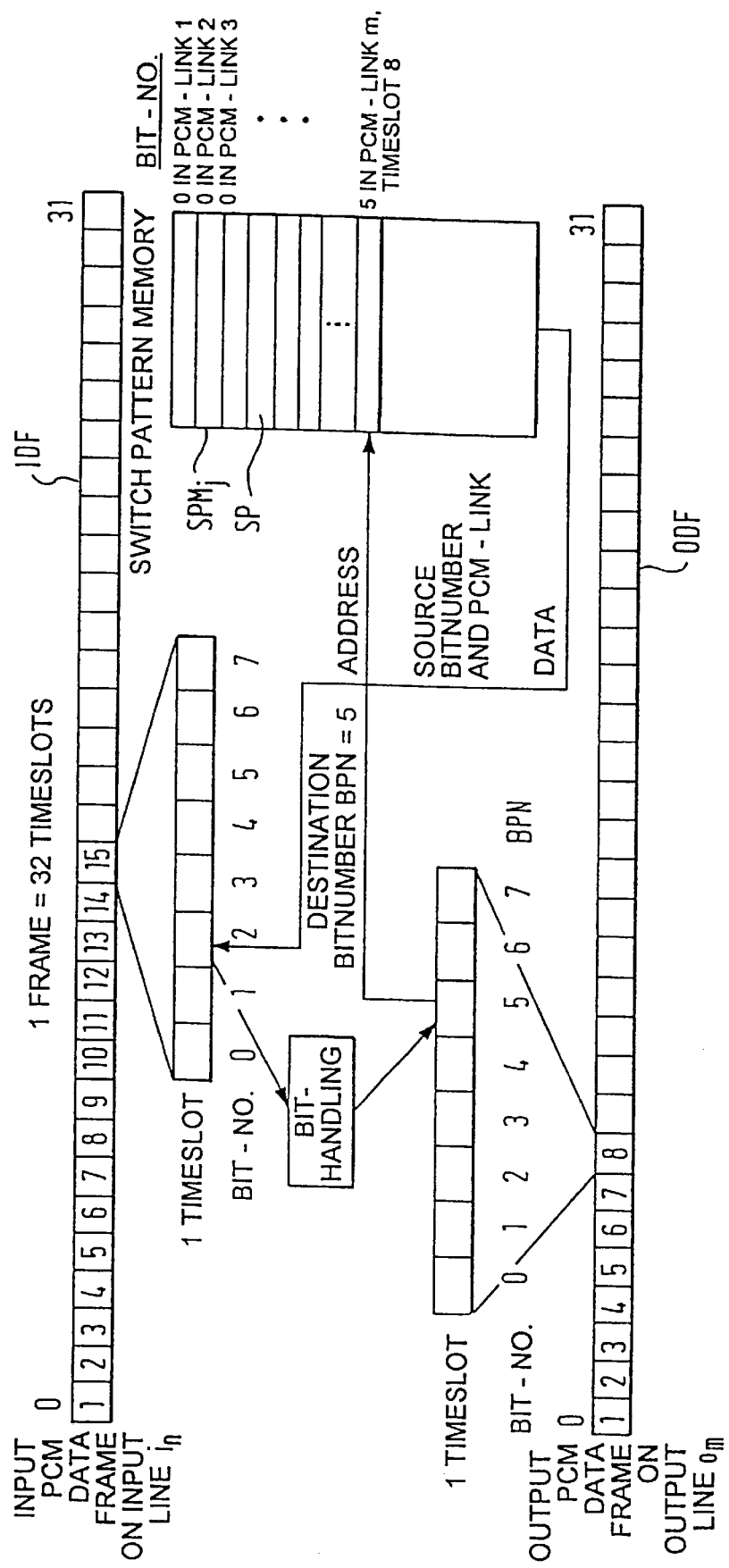
FIG. 7 shows the sub-rate switching using a switch pattern memory SPM of FIG. 6.

FIG. 7 shows the principle function of the sub-rate switching device when using a switch pattern memory $SPM_j$ for selecting bits from bit positions in an input PCM data frame IDF on an input line in and assigning these bits to an output PCM data frame ODF in an output line $o_m$. It should be understood that FIG. 7 shows the overall working principle of using the switch pattern SP in a switch pattern memory $SPM_j$ for the example of a basic unit which only comprises one switch pattern memory and one frame store memory. A further embodiment using two switch pattern units and two frame store memories will be further explained below with reference to FIG. 8-2 and FIG. 10-2. FIG. 7 is used for explaining the sequential selection of bits and the assigning of bits from individual time slots of one input PCM data frame IDF to one output PCM data frame ODF.

In FIG. 7, it is assumed that the input PCM data frame IDF comprising 32 time slots (256 bits) as an example is already stored in a frame store memory. The basic function is the generation of an output PCM data frame ODF on an outgoing PCM-link $o_m$ controlled by the switch pattern memory $SPM_j$ and respective bits are fetched from bit positions of the input PCM data frame IDF stored in the frame store memory. It is to be noted that a bit-orientated selection and assigning is performed where all 256 bits in each output data frame of each outgoing PCM-link are defined in the switch pattern memory. Each outgoing PCM bit is described in its own entry in the switch pattern memory in terms of a data source, i.e. from which incoming PCM data frame a bit should be selected and which bit it is. The data in the switch pattern memory is organized in the same order as the bits are generated in the respective output PCM data frame of the respective PCM output line $o_m$. As is indicated in FIG. 7, the organization of the switch pattern is such that first bit 0 on the first PCM-link (respectively on its output data frame), then bit 0 on the second PCM-link (its respective output data frame) and so on up to bit 255 on the last PCM-link (respectively the output data frame thereof) is listed as indicated with the table shown next to the switch pattern memory.

The switch pattern therefore comprises a sequential list of numbers indicating bit positions to be read out from the stored input data frames, wherein the control means CU uses a bit position number BPN of said output data frame as an address for addressing the frame store memory, reads out a bit position from the addressed memory location of the switch pattern unit and uses this read-out bit position for addressing a memory location in the frame memory. Then, a bit value of the addressed memory location of the frame memory is read out and—via a bit handling module controlled by the switch pattern memory—this bit value is assigned to the bit position of the output data frame. Bit manipulations other than a mere assigning of the bit value to the selected bit position on the output frame, like inverting, setting, clearing or tri-stating a read bit value, are in fact controlled bitwise by the switch pattern memory SPM (just as the address function for each bit to be read out). That is, the bit handling module is controlled by an entry in the memory location addressed by the desired bit position in the output data frame which entry respectively indicates that the bit value to be read out from the frame memory should be left as it is, inverted, set, cleared or tri-stated, before it is assigned to the desired bit position on the output data frame. Thus, bit manipulations other than a mere writing of the read bit value to the output data frame can be performed.

In the example in FIG. 7, the current bit position number to filled in the output PCM data frame is number 5 of the 8-th time slot in the output PCM data frame. This bit position number BPN is used for addressing the switch pattern memory which outputs a data value indicating that the bit position to be read from the specified input PCM data frame IDF is the bit position 2 in the 15-th time slot. Then, the control means reads out the bit value from this bit position number 2 and assigns the bit value to the bit position number 5 in the 8-th time slot of the output PCM data frame.

Therefore, each memory location in the switch pattern memory describes one bit in the output PCM data frame for one particular PCM output line $o_m$. The switching device SRS is thus configured by means of loading a switch configuration data pattern (switch pattern) into the switch pattern memory SPM which is known before-hand. The control means works at a higher clock rate than the input PCM bit rate, such that it can process all PCM input data frames of all input lines at a certain bit position during one PCM bit time in a time-shared process. For example, when in FIG. 7, the switch pattern memory is to handle 8 input lines and 8 output lines, then during the reading-in of one input bit (of each individual input data frame of the 8 input lines) one output bit is respectively to be simultaneously assigned on respective 8 output data frames on 8 output lines. To allow this bit-synchronized reading-in and outputting of bits, the selection process must run at a clock rate of 8 times the input bit rate.

Working Principle of the Frame Store Buffer

With respect to the bit-synchronized reading-in and assigning operation, ideally, it would be desirable to only store one input data frame for each frame period. That is, it would be desirable that during the process of reading-in one bit for all input data frames of all input lines, there is already simultaneously an assigning of one bit to all output data frames o n all output lines. However, this is not possible, since one bit, which is currently read in, cannot at the same time be assigned to an output data frame before it is stored. Likewise, a similar problem occurs when a bit position is accessed which has as yet not been written.

Therefore, the frame store buffer must at least store two consecutive input data frames to allow the reading-in of bits, the selection of bits (at the higher clock rate) and th e assigning of bits to an output data frame in a bit-synchronized manner.

Furthermore, the reading-in of bits and storing the bits as well as the selection and assigning of bits requires some processing time such that there is a further delay which might cause an overlapping of only two stored in put data frames in the frame store buffer FSB. To ensure the bit-synchronized reading and writing, therefore, the frame store buffer FSB must in total store three consecutive input data frames for each PCM input line. Thus, the timing relation between PCM input data frames and PCM output data frames is exactly a delay of two frames ($250 \mu s$). However, this ensures that all incoming data frames and all outgoing data frames are synchronized both at frame and bit level. Furthermore, a time delay of two data frames does not cause any problems in a telecommunication link.

One interesting aspect with respect to FIG. 7 should be observed. Despite the fact that FIG. 7 can basically perform the sub-rate switching, it does not treat the individual time slots or even the sub-time slots separately. The switch pattern memory does not care about the fact whether the selected bit belongs to a time slot of a full rate or to a sub-time slot (or sub-channel) of a smaller bit rate. The switching is entirely carried out bit-wise and bit-synchronized as explained above.

Embodiment of the Switching Device for K=2

As described above, the control means has to process all PCM-links for a certain bit position during one bit time. To ensure this, timing is kept at a level where difficulties with the implementation is avoided in terms of components and board manufacturing and a division of the sub-rate switching device SRS into parallel working units is introduced as generally shown in FIG. 8-1.

Figure 2:
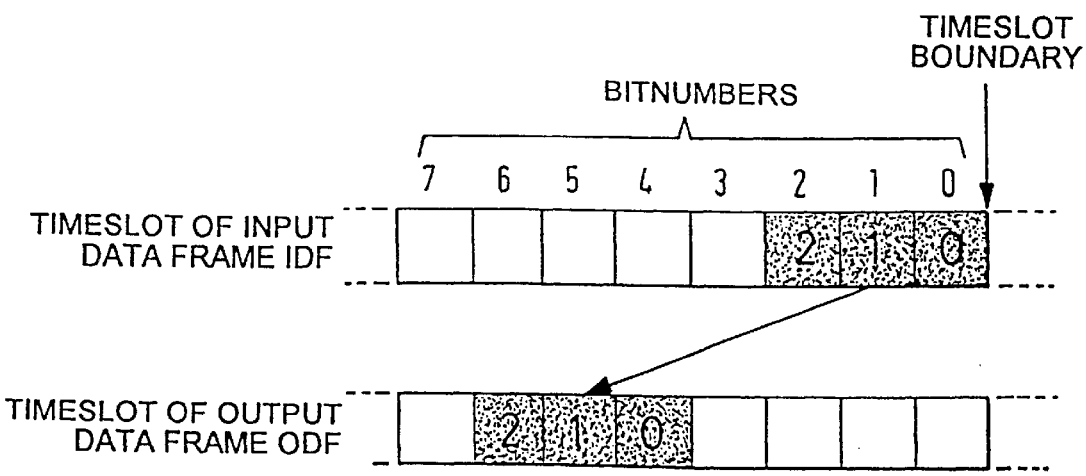
FIG. 2 shows an example of a 24 kbits/s sub-rate connection.
Figure 3:
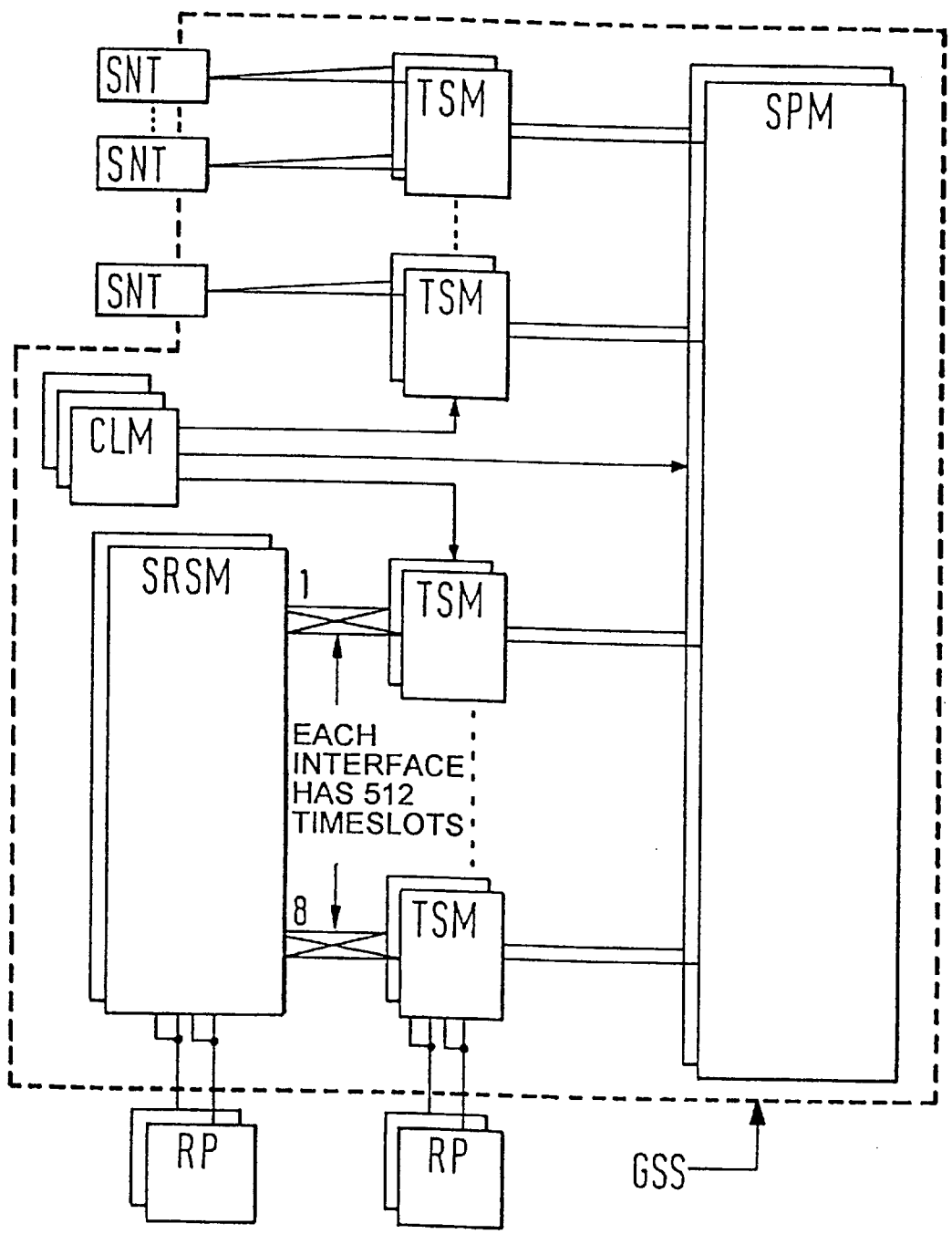
FIG. 3 shows a group switch sub-system architecture with a sub-rate switch module for the proposed add-on configuration in FIG. 1.

An embodiment using two units, an odd unit and an even unit, is shown in FIG. 8-2. Here, it is assumed that N=M (see FIG. 8-1), i.e. the number of input lines is the same as the number of output lines. Since K=2, there will only be two output line sub-groups. According to FIG. 8-2, the output lines sub-groups are grouped, such that the frame store memory $FSB_o$ is used for assigning bits only to the odd-numbered output lines, i.e. to the output lines with number 1, 3, 5, 7, 9, . . . Likewise, the frame store memory $FSB_e$ is used for assigning bits on output data frames only on even-numbered output lines, i.e. output lines with numbers 2, 4, 6, 8, 10, 12, . . . Furthermore, the s witch pattern memory comprises two switch pattern units, odd and even $SPM_o$, $SPM_e$, which each contain only a switch pattern SP used for assigning bits to output data frames only on even or odd output lines.

In total, the odd and even switch pattern units require the same storage capacity as the single switch pattern memory shown in FIG. 7, however, the individual odd and even switch pattern itself is differently organized. That is, as is seen in FIG. 10-2, the control means CU only addresses the odd switch pattern unit $SPM_o$ with bit positions on output data frames on odd-numbered output lines. Likewise, the even switch pattern unit $SPM_e$ is only addressed with bit positions of output data frames on even-numbered output lines.

Although FIG. 8-2 shows an example with N=M=16, there is no limitation on the number of input and output lines for K=2. As explained above, a basic unit would comprise 8 input and 8 output lines and one switch pattern unit and one frame store memory (K=1), the next rescaled basic switching size comprises 16 input and 16 output lines with two switch pattern units and two frame store memories (K=2) . . . That is, rescaling the basic unit K times yields a switching device for sub-rate and full rate switching from K*8 input lines to K*8 output lines using a number of K units, i.e. K switch pattern units and K frame store memories.

Bit-synchronized Operation

Figure 9:
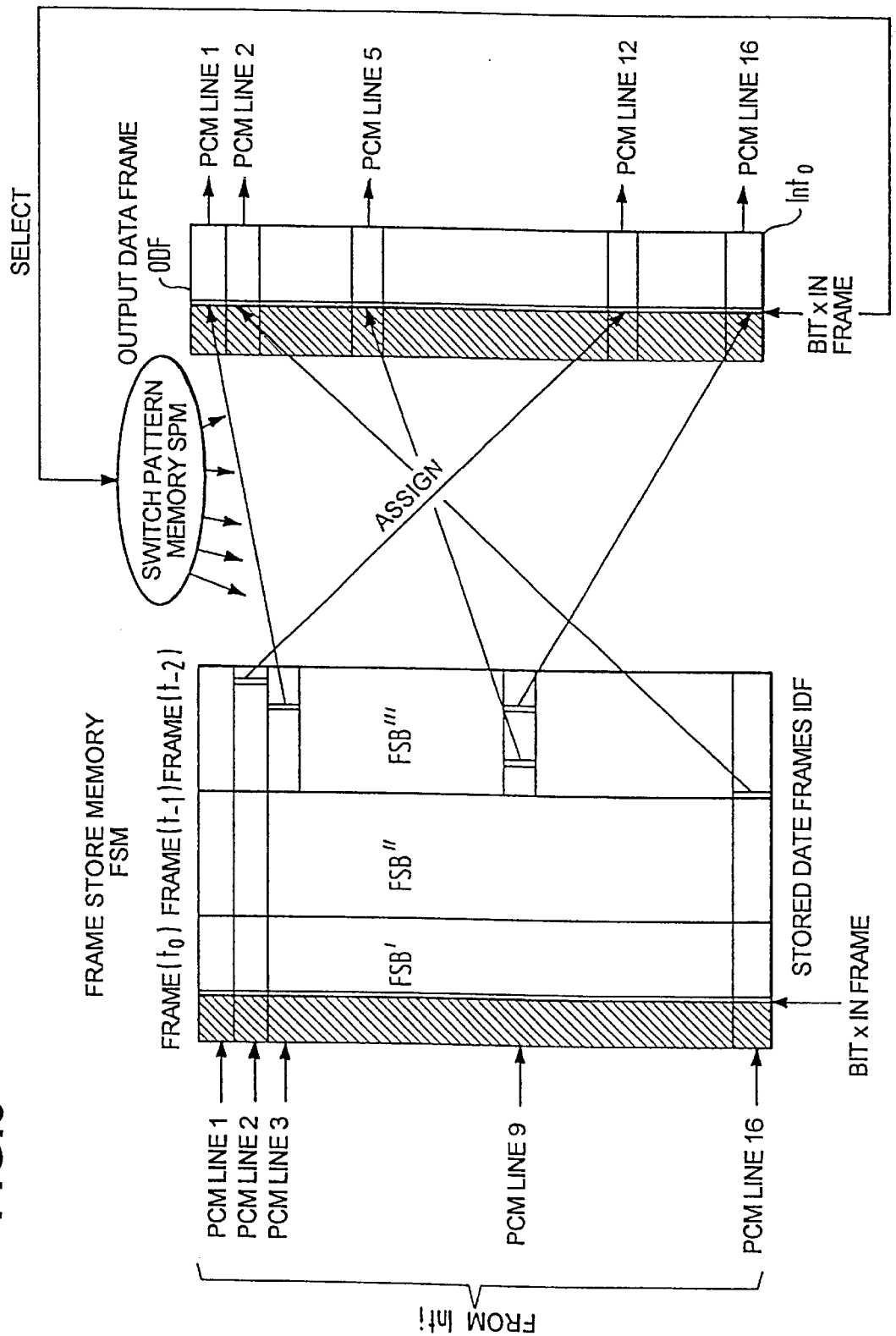
FIG. 9 shows the general switching function performed by the switch pattern memory SPM in FIG. 8-1 and FIG. 8-2.

FIG. 9 shows the bit-synchronized operation for the embodiment in FIG. 8-2 for the case of 16 input and 16 output lines. As is seen in FIG. 9, the frame store memory FSM contains three frame store units FSB', FSB", FSB'" for storing input data frames successively over three frame periods $t_0$, $t_{-1}$, $t_{-2}$.

FSB' stores the input data frames which are read in from the input lines at the present frame period $t_0$, FSB" stores input data frames of one frame period before $t_0$, i.e. at $t_{-1}$ and FSB'" stores input data frames of two frame periods before $t_0$, i.e. at $t_{-2}$. Therefore, FSB'" stores the frames read in two frame periods earlier which are used for assigning bits to the output data frames (i.e. used for the sub-rate switch function), whilst simultaneously bits are read into FSB'. FSB is a circular buffer.

The shaded regions in the frame store memory and the output data frame indicate the simultaneous reading-in of one bit x from all input data frames and the simultaneous assigning (writing) of one bit x to all output data frames ODF on all output PCM lines 1, 2, . . . 16. That is, whilst one bit x is read into the frame store buffer FSB', the control means uses the switch pattern memory SPM for selecting one bit of the input data frames stored in the frame store unit FSB'" to be assigned to the same (!) bit position x in the output data frame ODF.

As FIG. 9 shows, it is possible to select any bit from any input data frame stored at time $t_{-2}$. That is, whilst only one bit is selected and assigned from the input data frame at time $t_{-2}$ of PCM line 2 and PCM line 3, it is possible to select two different bits from one input data frame or in fact from one time slot or two different time slots or from different sub-channels of one time slot simultaneously as is shown for the input data frame of $t_{-2}$ for PCM line 9. Since the selection and assigning using the switch pattern memory is a sequential process respectively for the odd and even grouped output data lines, it is clear that the assigning and selection of bits for a respective sub-group of output lines must run at a higher clock rate than the input bit rate of the parallely and frame- and bit-synchronized arriving input data frames.

This is further illustrated in FIG. 10-1. FIG. 10-1 shows the configuration of FIG. 8-2 on the bit handling level. That is, the switch pattern unit odd $SPM_o$ is used for the sequential bit selection and bit assigning (bit handling) of bits in the output data frames of odd-numbered PCM output lines 1, 3, 5, 7, 9, 11, 13, 15. Likewise, the even switch pattern memory $SPM_e$ is used for the bit selection and bit assignment (bit handling) of bits intended for output data frames on even-numbered PCM output lines 2, 4, 6, 8, 10, 12, 14, 16. The bit handling module selects bits from the input data frames stored at time $t_{-2}$ in the third frame store unit $FSB_o'''$ and $FSB_e'''$, respectively.

FIG. 9 shows the overall timings when writing frames to the frame store memory and generating the resulting output frame. As is seen in FIG. 9, since the reading-in and assigning of bits is done simultaneously for one bit position x in the input data frames and the output data frames, the operation is fully synchronized on a bit level, and thus on a frame level.

FIG. 10-1 shows how the two parallelly working units operate. In each unit, 8 bits are processed sequentially (one bit from each of the 8 PCM input lines) during one bit time of the incoming frames which is 1/2048≈488 ns. This makes the basic bit handling rate (the clock rate for selection and assigning) in each module 488 $\mu s$/8=61 ns.

The bit handling modules thus works—according to the switch pattern stored in the switch pattern memory—at a clock frequency of 8 times the PCM bit frequency, so that it can process all 8 PCM-links during one input PCM bit time. The control means CU which controls the data flow consists mainly of two state machines, one for reading in input data frames into the frame store memories and the other for selecting and assigning (i.e. generating) bits on the output data frames on the output lines. All PCM-links are synchronized at a bit level and frame period level.

The sub-rate switching device of the invention uses the bit rate clock and the frame clock which both can be extracted from only one of the incoming PCM lines.

The sub-rate switch uses PCM-lines at the input and output with TTL level signals plus a separate bit rate clock and a separate frame rate clock. Extraction of clocks and signal conversions to TTL are done outside this unit.

The basic clock internally used for the sequential selection of bits (in FIG. 9 and FIG. 10-1 for N=M 8 times the bit rate clock) can be generated from a phase-lock loop unit locked to the bit rate clock. Since the internal clock rate can thus be extracted from the incoming input data frames, the switching of the data frames is fully synchronized on the bit level and frame level. There is no distinction between time slots and sub-time slots when switching the data frames, since the switching is performed in a bit-orientated manner, rather than the consideration of separate time slots as was explained above with reference to the alternative proposal in FIG. 4 (see the time slot selector SPM'). As shown in FIG. 8, in principle any bit value of any bit position of the stored data frames can be read out and written (assigned) to any arbitrary bit position on any output data frame using the switch pattern memory. Therefore, in principle data (bit values) from several frames can be selected so as to perform a multi-frame switching (which is possible, however complicated).

Figure 11:
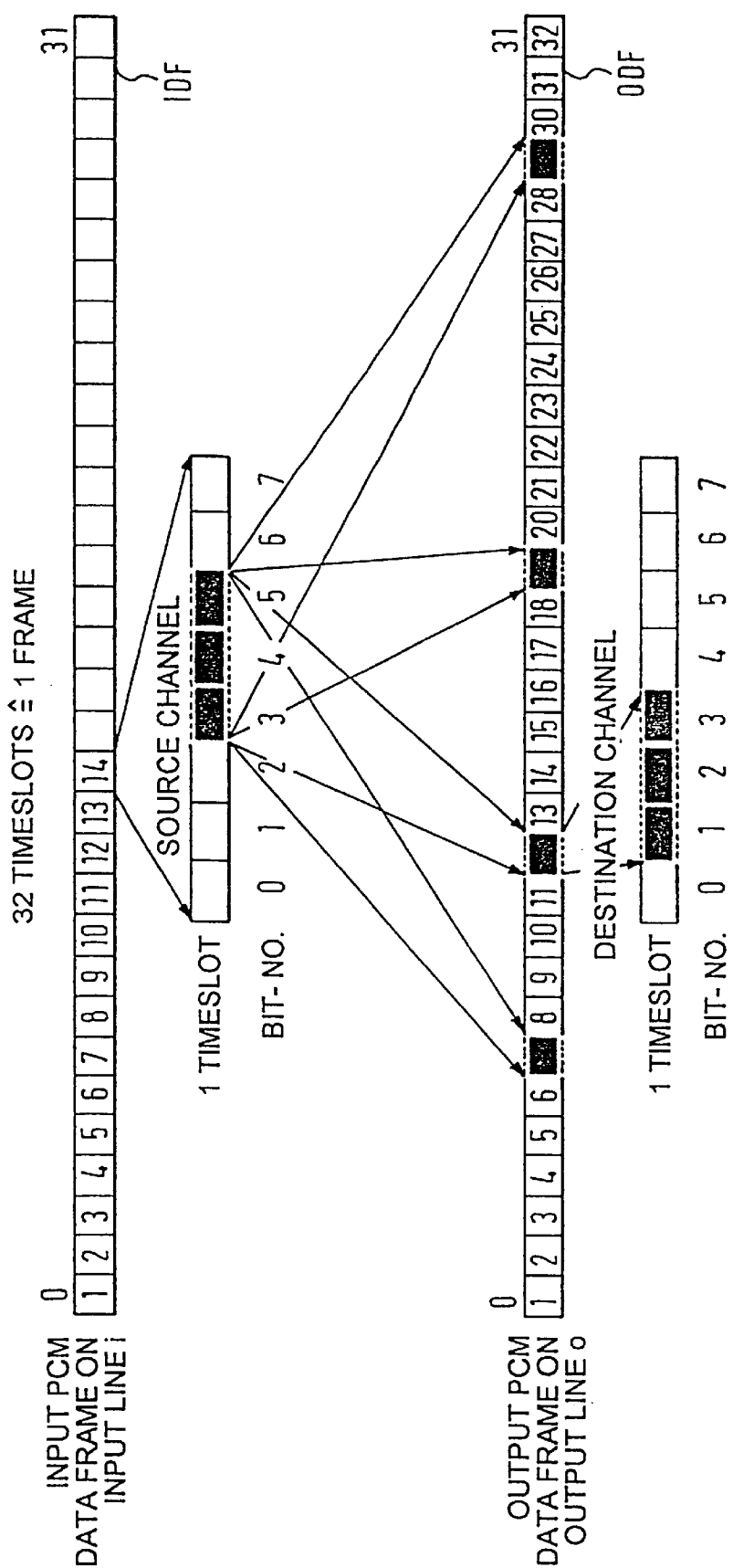
FIG. 11 shows the broadcast function performed by a copy means of the inventive device, where a modified switch pattern is used in order to copy one bit of an input data frame simultaneously to several bit positions on the output data frame.

This bit-orientated switching allows further extensions as will be discussed below with reference to FIG. 11.

Embodiment of the Switching Device Including a Copy Function

In FIG. 8-1, FIG. 7, FIG. 8-2, the control means CU can contain a copy means for assigning one particular bit selected from the stored input data frame to at least two bit positions in the same output data frame or in fact in two different output data frames. The copy means can assign this selected bit also to at least two bit positions in different time slots or to several time slots on the same output data frame. This is shown schematically in FIG. 11. The bit value of the fourth bit position number 3 of the time slot 14 in an input PCM data frame is copied to a bit position in the 7-th time slot, the 12-th time slot, the 19-th time slot and the 29-th time slot of the respective output PCM data frame. Likewise, the 6-th bit value in the 14-th time slot of the input data frame is copied to the 7-th, the 12-th, the 19-th and the 29-th time slot of the output PCM data frame ODF.

That is, the 12-th time slot of the output data frame ODF can contain a bit value at bit position number 1 which is a bit value that is not copied into any other time slot. The bit values of bit position numbers 2, 3 correspond to the copied bit values from bit position number 3, 5 of time slot 14 of the input data frame IDF.

The operation for implementing the copy or broadcast function using the switch pattern memory is similar to the one used in FIG. 7 and in FIG. 10-2. That is, what needs to be filled is respectively a bit position in the output data frame ODF or respectively in a time slot or sub-time slot of this output data frame ODF. Therefore, e.g. the bit position number 2 of time slot 12 used for addressing the switch pattern memory results in the selection and assigning of the bit value of bit position number 2 of time slot 14 of the input data frame. When the control means comes to the selecting and assigning of bits to the time slot 19 of the output data frame ODF, the switch pattern memory entry addressed with a bit position number of time slot 19 contains again the same data value indicating the bit position number 2 of the time slot 14 of the input data frame IDF. Therefore, the bit value of bit position number 2 of time slot 14 is also written (i.e. copied) into the second time slot 19 in this output data frame.

This copy function is also independent from the organization of the switch pattern in one or two switch pattern units $SPM_o$, $SPM_e$ in FIG. 10-1 or in FIG. 8-1 or FIG. 8-2. The copy function only means that the switch pattern memory contains entries indicating a particular bit position to be read out from the stored input data frame not only once but at least twice or possibly a plurality of times (in the example in the FIG. 11 e.g. three times). Into which time slot and into which output data frame the bit value is copied is entirely freely selectable. Therefore, the copy function is realized by simply loading a special copying switch pattern into the switch pattern memory. Since the switching function works on the bit level as described above, the copy function is just a special implementation of a switch pattern in the switch pattern memory without any additional storage requirements.

Therefore, when doing the frame or packet switching in the switching device, e.g. one particular input data frame can be copied to two different output lines simultaneously. Thus, e.g. a call in a mobile telecommunication system can be switched to two individual subscribers simultaneously. This is also true when the speech is compressed such that individual subscribers only occupy a sub-time slot (or sub-channel), since the copy function is equally well applicable to the copying of individual time slots or individual sub-time slots. This is due to the fact that the switching device is bit-orientated rather than time slot- or frame-orientated.

Apart from the copy function where a sub-rate is copied to several time slots on several PCM output lines, the bit handling module can—due to the bit-orientated processing—perform bit manipulations, e.g. inversions, settings, clearing or tri-state manipulations as already explained above. That is, there are entries in the switch pattern memory other than a mere reading and assigning of a read bit value to the respective output data frame.

Furthermore, an error detection can be performed, frame synchronization errors can be determined and PCM clock slips may be detected. Moreover, the bit-wise handling allows a parity bit evaluation for the data error detection. Furthermore, to increase the redundancy, two sub-rate switch modules each configured as in FIG. 8-1, FIG. 8-2 may be provided to work in parallel. In this case, the switch pattern memory SPM has in fact two partitions that enable writing a new switch pattern while "running" the old switch pattern. The activation of the new pattern (in the other partition) is made at the frame synchronization.

Industrial Applicability

The switching device and the method of the invention find wide applicability in telecommunication networks, in particular in mobile cellular telecommunication networks or in testing and simulation systems where data is transmitted as individual bits in individual frames. The switching device can carry out a full rate or a sub-rate switching with a minimum hardware requirement by using parallelly working units which each operate in a time-shared process. The implementation is highly economical in terms of components utilization and the production of circuit boards used therefore. That is, the inventive switching device can be implemented on a standard European printed circuit board (PCB) of 233×160 mm$^2$ or in an ASIC device.

The invention is not limited to the specific embodiments and examples described herein and various modifications and variations can be made by a skilled person in view of the above teachings within the scope of the invention as defined in the attached claims.

Reference numerals in the claims only serve illustration purposes and do not limit the scope of the attached claims.

What is claimed is:

1. A device (SRS) for switching input data frames (IDF) from a plurality of N input lines ($i_1$, $i_2$, ... $i_n$, $i_N$) to output data frames (ODF) on a plurality of M output lines ($o_1$, $o_2$, ... $o_n$, $o_M$), comprising:

a) a frame memory (FSB) for storing input data frames;

b) a switch pattern memory (SPM) for storing a predetermined switch pattern (SP); and c) a control means (CU) for selecting bits from bit positions (0–255) in said stored input data frames and for assigning said selected bits to bit positions (0–255) on output data frames according to said stored predetermined switch pattern (SP); wherein d) said frame memory (FSB) comprises a number j=2 to K of frame memories ($FSB_1$, $FSB_j$, $FSB_K$) each storing all input data frames of all input lines;

e) said switch pattern memory (SPM) comprises a number of j=2 to K of switch pattern units ($SPM_1$, $SPM_j$, $SPM_K$) each storing a predetermined switch pattern (SP) associated with a respective one of said frame memories; and f) said control means (CU) is provided for sequentially selecting a respective number of M/K bits from input data frames stored in a j-th frame memory, with j=1 to K, according to a respective switch pattern stored in an associated j-th switch pattern unit ($SPM_j$), and for assigning said selected bits to bit positions simultaneously on output data frames on a predetermined output line sub-group including M/K output lines.

2. A device according to claim 1, wherein the output lines are grouped into said sub-groups by respectively grouping every j-th output line together in one sub-group, wherein said control means (CU) assigns said selected bits simultaneously to every j-th output line according to the switch pattern stored in the j-th switch pattern memory ($SMP_j$).

3. A device according to claim 1, wherein for K=2 said frame memory (FSB) comprises a first and a second frame memory ($FSB_e$, $FSB_o$) and said switch pattern memory (SPM) comprises a first and a second switch pattern unit ($SPM_e$, $SPM_o$) for storing an odd switch pattern for assigning bits to a first sub-group of M/2 odd output lines (1, 3, 5 ... M−1) and for storing an even switch pattern for assigning bits to a second sub-group of M/2 even output lines (2, 4, 6 ... M), respectively.

4. A device according to claim 2, wherein for K=2 said frame memory (FSB) comprises a first and a second frame memory ($FSB_e$, $FSB_o$) and said switch pattern memory (SPM) comprises a first and a second switch pattern unit ($SPM_e$, $SPM_o$) for storing an odd switch pattern for assigning bits to a first sub-group of M/2 odd output lines (1, 3, 5 ... M−1) and for storing an even switch pattern for assigning bits to a second sub-group of M/2 even output lines (2, 4, 6 ... M), respectively; and K=2 and N=M=16; and for said control means (CU) uses said odd switch pattern for assigning bits to output data frames on output lines with the numbers 1, 3, 5, 7, 9, 11, 13, 15 and said even switch pattern for assigning bits to output data frames on output lines with the numbers 2, 4, 6, 8, 10, 12, 14, 16.

5. A device according to claim 1, wherein each of said j=1 to K frame units ($FSM_1$, $FSM_j$, $FSM_K$) is divided into a first, second and third frame memory unit (FSB', FSB", FSB''') for respectively storing three successive input data frames ($t_0$, $t_{-1}$, $t_{-2}$) from all input lines.

6. A device according to claim 5, wherein a clock module (CLM) provides an internal clock and said control means (CU) reads one bit from respective bit positions of input data frames of all input lines into a respective bit position in said first frame memory unit (FSB'), while it simultaneously assigns one bit respectively selected from said third frame memory unit (FSB''') to respective bit positions on the output data frames synchronized to said internal clock.

7. A device according to claim 6, wherein when all bits of the output data frames are assigned, said control means outputs the output data frames to the output lines via an output interface ($INT_o$) and shifts the stored input data frames from said second to said third and from said first to said second frame memory unit (FSM"→FSM'"; FSM'→FSM").

8. A device according to claim 6, wherein said reading in, said selecting and assigning of bits is performed by said control means (CU) in a bit synchronized manner and said outputting and shifting of stored input data frames is carried out in a frame synchronized manner by said control means (CU) using said internal clock (CLM).

9. A device according to claim 1, wherein the input data frames and the output data frames comprise a number (e.g. 32 or 24) of time slots each containing a predetermined number of bits (0–7), wherein said switch pattern units respectively contain a switch pattern for selecting bits from bit positions of one time slot of an input frame and said control unit (CU) assigns said selected bits to a respective time slot of an output data frame.

10. A device according to claim 1, wherein said switch pattern units respectively contain as said switch patterns a sequential list of numbers indicating bit positions to be read out from said stored input data frames, wherein said control unit (CU) uses a bit position number (BPN) of the output data frame as an address for addressing an associated frame memory, reads out a bit position from said addressed memory location of said switch pattern unit, uses said read out bit position for addressing a memory location in said frame memory, reads out a bit value of said addressed memory location of said frame memory and assigns this bit value to said bit position of the output data frame.

11. A device according to claim 9, wherein said switch pattern units respectively contain as said switch patterns a sequential list of numbers indicating bit positions to be read out from said stored input data frames, wherein said control unit (CU) uses a bit position number (BPN) of the output data frame as an address for addressing an associated frame memory, reads out a bit position from said addressed memory location of said switch pattern unit, uses said read out bit position for addressing a memory location in said frame memory, reads out a bit value of said addressed memory location of said frame memory and assigns this bit value to said bit position of the output data frame; and said switch pattern units contain a sequential list of bit positions of time slots of the output data frames, wherein said bit positions indicated to be read out from the input data frames are arbitrary bit positions of any time slot of the stored input data frames.

12. A device according to claim 1, wherein said control means (CU) comprises a copy means (CM) for assigning a bit selected from said stored input data frame to at least two bit positions in the same output data frame.

13. A device according to claim 9, wherein said control means (CU) comprises a copy means (CM) for assigning a bit selected from said stored input data frame to at least two bit positions in the same output data frame; and said copy means (CM) selects one bit of one time-slot of one input data frame and assigns this bit to at least two bit positions in different time slots of the same output data frame.

14. A device according to claim 9, wherein said control means (CU) comprises a copy means (CM) for assigning a bit selected from said stored input data frame to at least two bit positions in the same output data frame; and said copy means (CM) selects several bits of one time-slot of one input data frame and assigns these bits to bit positions in several time slots of the same output data frame.

15. A device according to claim 12, wherein said copy means (CM) assigns a bit selected from said stored input data frame to at least two bit positions in at least two different output data frames.

16. A device according to claim 9, wherein said time slots respectively contain a different number of bits.

17. A device according to claim 9, wherein said time slots are further divided into sub-channels each containing a predetermined sub-number of said bits contained in said time slot.

18. A device according to claim 4, wherein the input lines are PCM-links having a predetermined bit rate (2 Mbit/s), wherein said internal clock for selecting bits and assigning bits to the output data frames is 8 times the bit rate (61 ns).

19. A device according to claim 10, wherein each number in said switch pattern memory (SPM) indicating a predetermined bit position to be read out from said stored input data frames has associated a bit handling entry indicating a predetermined bit handling function for the read out bit value before it is assigned to the output data frame.

20. A device according to claim 19, wherein said bit handling function indicates a direct writing, an inversion, a setting, a clearing or a tri-stating of said read bit value before it is assigned to said output data frames.

21. A method for switching input data frames (IDF) from a plurality of N input lines ($i_1, i_2, \ldots i_n, i_N$) to output data frames (ODF) on a plurality of M output lines ($o_1, o_2, \ldots o_n, o_M$), comprising the following steps:

a) storing input data frames in a frame memory (FSB);

b) storing a predetermined switch pattern (SP) in a switch pattern memory (SPM);

c) selecting bits from bit positions (0–255) in said stored input data frames and assigning said selected bits to bit positions (0–255) on output data frames according to said stored predetermined switch pattern (SP) by a control means (CU);

d) storing all input data frames of all input lines in a number j=2 to K of frame memories ($FSB_1$, $FSB_j$, $FSB_K$);

e) storing a predetermined switch pattern (SP) associated with a respective one of said frame memories in a number of j=2 to K of switch pattern units ($SPM_1$, $SPM_j$, $SPM_K$);

f1) sequentially selecting a respective number of M/K bits from input data frames stored in a j-th frame memory, with j=1 to K; and f2) simultaneously assigning said selected bits to bit positions on output data frames on a predetermined output line sub-group including M/K output lines according to a respective switch pattern stored in an associated j-th switch pattern unit ($SPM_j$).

22. A device (SRS) for switching input data frames (IDF) from a plurality of N input lines ($i_1, i_2, \ldots i_n, i_N$) to output data frames (ODF) on a plurality of M output lines ($o_1, o_2, \ldots o_n, o_M$), comprising:

a) a frame memory (FSB) for storing input data frames;

b) a switch pattern memory (SPM) for storing a predetermined switch pattern (SP); and c) a control means (CU) for selecting bits from bit positions (0–255) in said stored input data frames and for assigning said selected bits to bit positions (0–255) on output data frames according to said stored predetermined switch pattern (SP); wherein d) said frame memory (FSB) comprises a number j=2 to K of frame memories ($FSB_1$, $FSB_j$, $FSB_K$) each storing all input data frames of all input lines;

e) said switch pattern memory (SPM) comprises a number of j=2 to K of switch pattern units ($SPM_1$, $SPM_j$, $SPM_K$) each storing a predetermined switch pattern (SP) associated with a respective one of said frame memories;

f) said control means (CU) is provided for sequentially selecting a respective number of M/K bits from input data frames stored in a j-th frame memory, with j=1 to K, according to a respective switch pattern stored in an associated j-th switch pattern unit ($SPM_j$), and for assigning said selected bits to bit positions simultaneously on output data frames on a predetermined output line sub-group including M/K output lines; and g) for K=2 said frame memory (FSB) comprises a first and a second frame memory (FSB$_e$, FSB$_o$) and said switch pattern memory (SPM) comprises a first and a second switch pattern unit (SPM$_e$, SPM$_o$) for storing an odd switch pattern for assigning bits to a first sub-group of M/2 odd output lines (1, 3, 5 . . . M–1) and for storing an even switch pattern for assigning bits to a second sub-group of M/2 even output lines (2, 4, 6 . . . M), respectively.

23. A device (SRS) for switching input data frames (IDF) from a plurality of N input lines ($i_1, i_2, \ldots i_n, i_N$) to output data frames (ODF) on a plurality of M output lines ($o_1, o_2, \ldots o_n, o_M$), comprising:
   a) a frame memory (FSB) for storing input data frames;
   b) a switch pattern memory (SPM) for storing a predetermined switch pattern (SP); and
   c) a control means (CU) for selecting bits from bit positions (0–255) in said stored input data frames and for assigning said selected bits to bit positions (0–255) on output data frames according to said stored predetermined switch pattern (SP); wherein
   d) said frame memory (FSB) comprises a number j=2 to K of frame memories (FSB$_1$, FSB$_j$, FSB$_K$) each storing all input data frames of all input lines;
   e) said switch pattern memory (SPM) comprises a number of j=2 to K of switch pattern units (SPM$_1$, SPM$_j$, SPM$_K$) each storing a predetermined switch pattern (SP) associated with a respective one of said frame memories;
   f) said control means (CU) is provided for sequentially selecting a respective number of M/K bits from input data frames stored in a j-th frame memory, with j=1 to K, according to a respective switch pattern stored in an associated j-th switch pattern unit (SPM$_j$), and for assigning said selected bits to bit positions simultaneously on output data frames on a predetermined output line sub-group including M/K output lines; and
   g) each of said j=1 to K frame units (FSM$_1$, FSM$_j$, FSM$_K$) is divided into a first, second and third frame memory unit (FSB', FSB'', FSB''') for respectively storing three successive input data frames ($t_0, t_{-1}, t_{-2}$) from all input lines.

24. A device (SRS) for switching input data frames (IDF) from a plurality of N input lines ($i_1, i_2, \ldots i_n, i_N$) to output data frames (ODF) on a plurality of M output lines ($o_1, o_2, \ldots o_n, o_M$), comprising:
   a) a frame memory (FSB) for storing input data frames;
   b) a switch pattern memory (SPM) for storing a predetermined switch pattern (SP); and
   c) a control means (CU) for selecting bits from bit positions (0–255) in said stored input data frames and for assigning said selected bits to bit positions (0–255) on output data frames according to said stored predetermined switch pattern (SP); wherein
   d) said frame memory (FSB) comprises a number j=2 to K of frame memories (FSB$_1$, FSB$_j$, FSB$_K$) each storing all input data frames of all input lines;
   e) said switch pattern memory (SPM) comprises a number of j=2 to K of switch pattern units (SPM$_1$, SPM$_j$, SPM$_K$) each storing a predetermined switch pattern (SP) associated with a respective one of said frame memories;
   f) said control means (CU) is provided for sequentially selecting a respective number of M/K bits from input data frames stored in a j-th frame memory, with j=1 to K, according to a respective switch pattern stored in an associated j-th switch pattern unit (SPM$_j$), and for assigning said selected bits to bit positions simultaneously on output data frames on a predetermined output line sub-group including M/K output lines;
   g) each of said j=1 to K frame units (FSM$_1$, FSM$_j$, FSM$_K$) is divided into a first, second and third frame memory unit (FSB', FSB'', FSB''') for respectively storing three successive input data frames ($t_0, t_{-1}, t_{-2}$) from all input lines;
   h) a clock module (CLM) provides an internal clock and said control means (CU) reads one bit from respective bit positions of input data frames of all input lines into a respective bit position in said first frame memory unit (FSB'), while it simultaneously assigns one bit respectively selected from said third frame memory unit (FSB''') to respective bit positions on the output data frames synchronized to said internal clock; and
   i) when all bits of the output data frames are assigned, said control means outputs the output data frames to the output lines via an output interface (INT$_o$) and shifts the stored input data frames from said second to said third and from said first to said second frame memory unit (FSM''→FSM'''; FSM'→FSM'').

25. A device (SRS) for switching input data frames (IDF) from a plurality of N input lines ($i_1, i_2, \ldots i_n, i_N$) to output data frames (ODF) on a plurality of M output lines ($o_1, o_2, \ldots o_n, o_M$), comprising:
   a) a frame memory (FSB) for storing input data frames;
   b) a switch pattern memory (SPM) for storing a predetermined switch pattern (SP); and
   c) a control means (CU) for selecting bits from bit positions (0–255) in said stored input data frames and for assigning said selected bits to bit positions (0–255) on output data frames according to said stored predetermined switch pattern (SP); wherein
   d) said frame memory (FSB) comprises a number j=2 to K of frame memories (FSB$_1$, FSB$_j$, FSB$_K$) each storing all input data frames of all input lines;
   e) said switch pattern memory (SPM) comprises a number of j=2 to K of switch pattern units (SPM$_1$, SPM$_j$, SPM$_K$) each storing a predetermined switch pattern (SP) associated with a respective one of said frame memories;
   f) said control means (CU) is provided for sequentially selecting a respective number of M/K bits from input data frames stored in a j-th frame memory, with j=1 to K, according to a respective switch pattern stored in an associated j-th switch pattern unit (SPM$_j$), and for assigning said selected bits to bit positions simultaneously on output data frames on a predetermined output line sub-group including M/K output lines; and
   g) said control means (CU) comprises a copy means (CM) for assigning a bit selected from said stored input data frame to at least two bit positions in the same output data frame.

26. A device for switching input data frames (IDF) from a plurality of N input lines ($i_1, i_2, \ldots i_n, i_N$) to output data frames (ODF) on a plurality of M output lines ($o_1, o_2, \ldots o_n, o_M$), comprising:
   a) a frame memory (FSB) for storing input data frames;
   b) a switch pattern memory (SPM) for storing a predetermined switch pattern,(SP); and
   c) a control means (CU) for selecting bits from bit positions (0–255) in said stored input data frames Ago and for assigning said selected bits to bit positions (0–255) on output data frames according to said stored predetermined switch pattern (SP);

d) said frame-memory (FSB) comprises a number j=2 to K of frame memories (FSB$_1$, FSB$_j$, FSB$_K$) each storing all input data frames of all input lines at one frame period;

e) said switch pattern memory (SPM) comprises a number of j=2 to K of switch pattern units (SPM$_1$, SPM$_j$, SPM$_K$) each storing a predetermined switch pattern (SP) associated-with a respective one of said frame memories;

f1) the M output lines (o1, o2, . . . on, oM) are grouped in K output line sub-groups each comprising M/K output lines, a respective frame memory (FSBj) and a respective switch pattern memory (SPM$_j$) each being provided only for assigning selected bits to bit positions (0–255) of output data frames on the output lines of said associated output line sub-group; and f2) said control means (CU) controls said respective frame memories and switch pattern memories such that at a bit allocation time (x) during a frame period for allocating a predetermined bit position in all output data frames, f21) a subnumber of M/K bits is sequentially selected from said respectively associated frame memory in accordance with a respective switch pattern;

f22) said predetermined bit position in all output data frames of said M/K output lines of a respective output line sub-group is allocated with one bit of said M/K bits selected by said associated switch pattern; and f23) the allocation of said predetermined bit position is simultaneously performed with said respective M/K bits in all output line sub-groups at said bit allocation time (x).

27. A method for switching input date frames (JDF) from a plurality of N input lines (i$_1$, i$_2$, i$_n$, i$_N$) to output data frames (ODF) on a plurality of N output lines (o$_1$, o$_2$, . . . n$_n$, o$_N$), comprising the following steps:

a) storing input data frames in a frame memory (FSB);

b) storing a predetermined switch pattern (SP) in a switch pattern-memory (SEIM); and c) selecting bits from bit positions (0–255) in said stored input data frames and assigning said selected bits to bit positions (0–255) on output data frames according to said stored predetermined switch pattern (SP) by a control means (CU);

d) storing all input data frames of all input lines in a number of j=2 to K frame memories (FSB$_1$, FSB$_j$, FSB$_K$) at one frame period;

e) storing a predetermined-switch pattern (SP) associated with a respective frame memory in a number of j=2 to K switch pattern units (SPM$_1$, SPMj, SPMK), wherein f1) the M output lines-(o1, o2, . . . on, oM) are grouped in K output line sub-groups each comprising M/K output lines, and a respective frame memory (FSBj) and a respective switch pattern memory (SPMj) each assigns selected bits only to bit positions (0–255) of output data frames on the output lines of said associated output line sub-group; and f2) at a bit allocation time (x) during a frame period for allocating a predetermined bit position in all output data frames, f21) sequentially selecting a subnumber of M/K bits from said respectively associated frame memory in accordance with a respective switch pattern;

f22) allocating said predetermined bit position in all output data frames of said M/K output lines of a respective output line sub-group with one bit of said M/K bits selected by said associated switch pattern; wherein f23) the allocation of said predetermined bit position is simultaneously performed with said respective M/K bits in all output line sub-groups at said bit allocation time (x).

* * * * *